(12) United States Patent
Noguchi et al.

(10) Patent No.: US 8,199,973 B2
(45) Date of Patent: Jun. 12, 2012

(54) IMAGE RECOGNITION METHOD, IMAGE RECOGNITION DEVICE, AND IMAGE RECOGNITION PROGRAM

(75) Inventors: Kazuto Noguchi, Sakai (JP); Koichi Kise, Sakai (JP); Masakazu Iwamura, Sakai (JP)

(73) Assignee: Osaka Prefecture University Public Corporation, Sakai-shi, Osaka (JP)

( * ) Notice: Subject to any disclaimer, the term of this patent is extended or adjusted under 35 U.S.C. 154(b) by 554 days.

(21) Appl. No.: 12/439,493

(22) PCT Filed: Aug. 1, 2007

(86) PCT No.: PCT/JP2007/065086
§ 371 (c)(1),
(2), (4) Date: Apr. 28, 2009

(87) PCT Pub. No.: WO2008/026414
PCT Pub. Date: Mar. 6, 2008

(65) Prior Publication Data
US 2010/0027895 A1 Feb. 4, 2010

(30) Foreign Application Priority Data

Aug. 31, 2006 (JP) ................................. 2006-236113
May 15, 2007 (JP) ................................. 2007-129737

(51) Int. Cl.
*G06K 9/00* (2006.01)
*H04N 7/16* (2011.01)
(52) U.S. Cl. .......................................... 382/103; 725/19
(58) Field of Classification Search .................. 382/159, 382/165, 170, 181, 190, 199, 225, 103; 348/169, 348/170, 171, 172, 173; 717/105, 109, 136; 725/19
See application file for complete search history.

(56) References Cited

U.S. PATENT DOCUMENTS

| | | | |
|---|---|---|---|
| 4,658,429 A * | 4/1987 | Orita et al. | 382/225 |
| 2003/0128876 A1* | 7/2003 | Yamaguchi | 382/190 |

(Continued)

FOREIGN PATENT DOCUMENTS

JP 60-142788 A 7/1985

(Continued)

OTHER PUBLICATIONS

European Search Report issued in European Patent Application No. 07791766.4 on Jul. 6, 2011.

(Continued)

*Primary Examiner* — Abolfazl Tabatabai
(74) *Attorney, Agent, or Firm* — Birch, Stewart, Kolasch & Birch, LLP.

(57) ABSTRACT

For object recognition based on nearest neighbor search of local descriptors such as SIFT, it is important to keep the nearest neighbor search efficient to deal with a huge number of descriptors. The present invention provides methods of efficient recognition. In one embodiment, the method is based on the observation that the level of accuracy of nearest neighbor search for correct recognition depends on images to be recognized. The method is characterized by the mechanism that multiple recognizers with approximate nearest neighbor search are cascaded in the order of the level of approximation so as to improve the efficiency by adaptively controlling the level to be applied depending on images. In another embodiment the method is characterized by excluding local descriptors with low discriminability when a plenty of local descriptors are present in the vicinity and a plenty of distance calculation are required.

14 Claims, 24 Drawing Sheets

U.S. PATENT DOCUMENTS

2004/0128656 A1 * 7/2004 Yamagata ..................... 717/136

FOREIGN PATENT DOCUMENTS

| JP | 63-132381 A | 6/1988 |
|---|---|---|
| JP | 4-84277 A | 3/1992 |
| JP | 5-233881 A | 9/1993 |
| JP | 6-168277 A | 6/1994 |
| JP | 2000-285190 A | 10/2000 |
| JP | 2003-242509 A | 8/2003 |
| JP | 2004-133629 A | 4/2004 |

OTHER PUBLICATIONS

Lowe et al., "Distinctive Image Features from Scale-Invariant Keypoints", International Journal of Computer Vision, vol. 60, No. 2 (Nov. 1, 2004) pp. 91-110.

Sivic et al., "Video Google: A Text Retrieval Approach to Object Matching in Videos", Proceedings of the Ninth IEEE International Conference on Computer Vision, vol. 2 (Oct. 13, 2003) pp. 1470-1477.

* cited by examiner

Fig.4
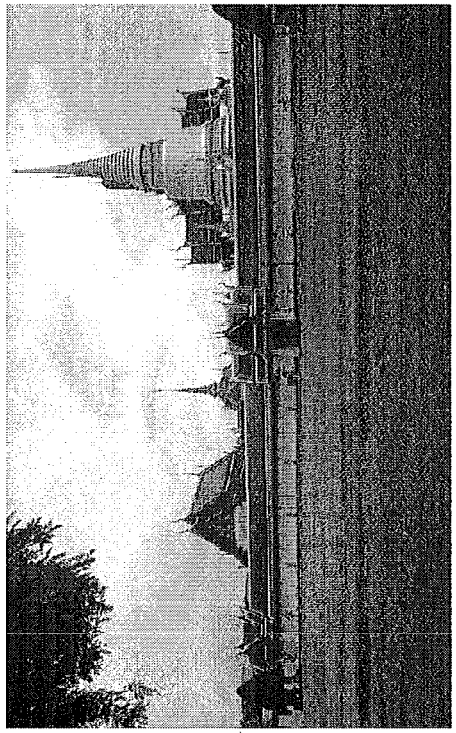
(b) EXEMPLARY IMAGE OF B
(c) EXEMPLARY IMAGE OF C
(a) EXEMPLARY IMAGE OF A Fig.5
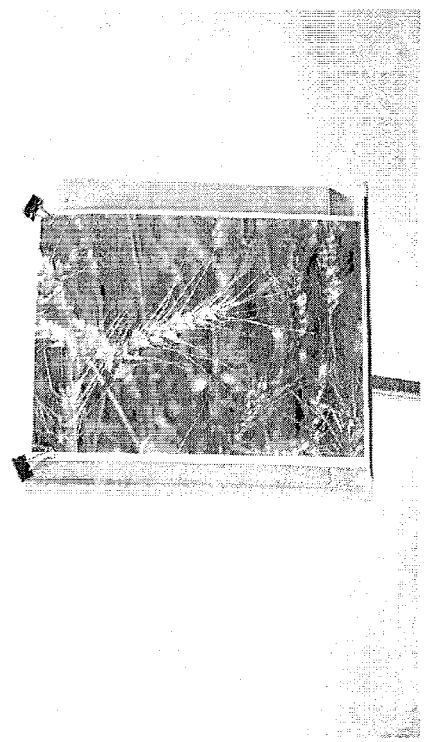
(b) PHOTOGRAPHING ANGLE 75 DEGREES
(d) A PART OF THE PHOTOGRAPH AT AN ANGLE OF 90 DEGREES
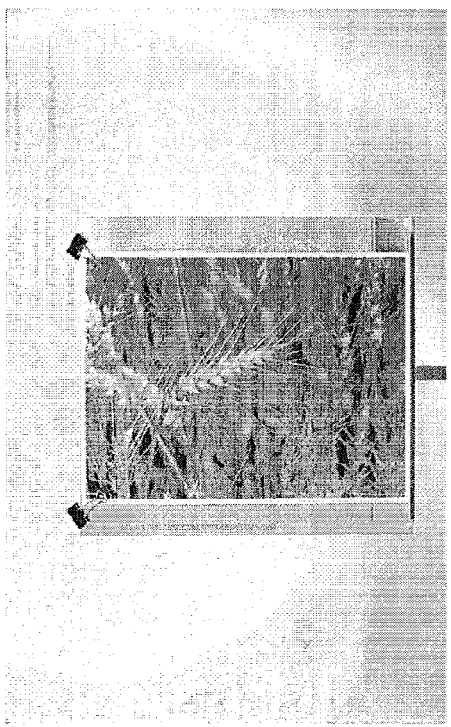
(a) PHOTOGRAPHING ANGLE 90 DEGREES
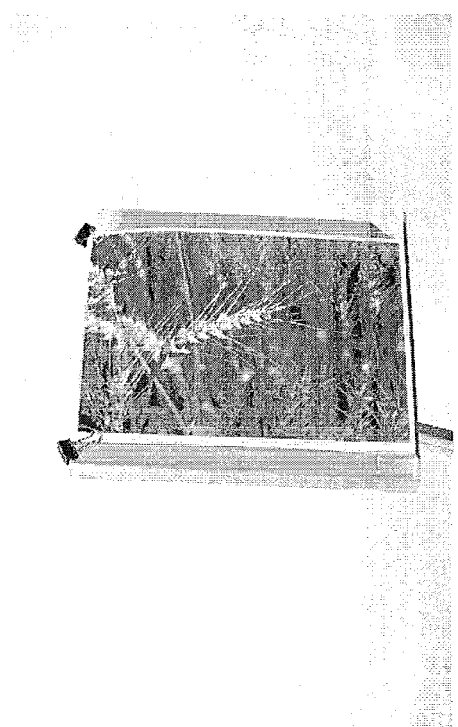
(c) PHOTOGRAPHING ANGLE 60 DEGREES

IMAGE RECOGNITION METHOD, IMAGE RECOGNITION DEVICE, AND IMAGE RECOGNITION PROGRAM

TECHNICAL FIELD

The present invention relates to an image recognition method for performing image recognition by using local descriptors each of which describes a local feature of an image, and an image recognition device and an image recognition program which perform image recognition by using the local descriptors.

BACKGROUND ART

Due to popularization of digital cameras and camera-equipped mobile phones, there is increased demand for using a camera not only for photographing a snapshot but also as an information input device. One of the possibilities to realize such demand is to recognize an object captured by a camera and to perform information processing, based on the recognized image.

It is still difficult to recognize an object having no limitation, however, thanks to technical development in recent years, the object recognition has been actualized since some limitation can be added to the object. For example, if it is possible that the object is not a three-dimensional object, but a pattern on a plane (planar object), and that an instance of the object (e.g., whether or not a photograph shows a certain model of car captured at a given angle) is to be recognized instead of a class of the object (e.g., whether or not the object in the photograph belongs to a category of cars), then the object recognition is already serviceable. Known as such examples are a service provided by Dai Nippon Printing Co., Ltd., which adopts technology of Clementec Co., Ltd. (US. Patent No. 20040208372), a service provided by Olympus Corporation, and a service provided by NEC Corporation which adopts technology of Evolution Robotics, Inc. If recognition of planar objects as above described is available, not only derivation from photographed posters or commodities, but also automatic indexing of existing images or videos can be achieved.

For the object recognition, features needs to be extracted from an image. The present invention focuses use of local descriptors in order to recognize a planar object. The local descriptor captures a local feature of an image, extracts the feature as a multidimensional feature vector, and then describes the local feature of the image. In this case, since values are determined locally, the local descriptor is relatively robust against occlusion and distortion of an image. Here, the word "local" implies a part of an image, and the "local descriptor" represents a partial feature of an image. In the present specification, the local descriptor is alternatively referred to as a feature vector.

In the object recognition method using the local descriptor, as a basic operation, distances between respective feature vectors obtained from two images are calculated, and nearest vectors are matched with each other. A feature vector in an image captured by a camera is matched with feature vectors in a large number of images in a database, and voting is performed with respect to the images in the database. Finally a label of an image having the largest number of votes is outputted as a "recognition result". However, since the number of dimensions of a feature vector ranges from several dozen to several hundred, and the number of feature vectors ranges several hundred to several thousand per image, it is obviously not practical to simply calculate distances of all combinations.

However, thanks to the development of the nearest neighbor search techniques in recent years, it is possible to retrieve a vast number of feature vectors in a shorter time (e.g., see non-patent documents 1, 2). Particularly, an ANN (Approximate Nearest Neighbor) (e.g., see non-patent document 3), and an LSH (Locality Sensitive Hashing) (e.g., see non-patent document 4) perform approximate nearest neighbor searching by using a tree structure and a hash table, respectively, and realize fast retrieving. In Japan, in addition to the SR-Tree for accurate nearest neighbor searching (e.g., see non-patent document 5), distributed coding disclosed by Kobayashi et al. can be cited as the approximate nearest neighbor search technique (e.g., see non-patent document 6).

Further from the viewpoint of the object recognition, Wada et al. has proposed a notion of a nearest neighbor classifier (e.g., see non-patent document 7), and a technique called a KDDT which embodies the notion (e.g., see non-patent document 8). Suppose a case where each object corresponds to one feature vector and a category of the object is to be recognized. In this case, a category which includes a feature vector that is nearest to the feature vector obtained from the object needs to be identified, and a nearest neighbor feature vector need not be obtained. Accordingly, compared to a case where the accurate nearest neighbor retrieving is used, processing speed can be improved by several to several hundred times.

Further, a method for extracting features the method being adaptable to indexing of a document image, and a search algorithm adaptable to the features are known (e.g., see patent document 1).

Patent document 1: International publication No. 2006/092957

Non-patent document 1: P. Indyk, Nearest neighbors in high-dimensional spaces, Handbook of discrete and computational geometry (Eds. by J. E. Goodman and J.O'Rourke), Chapman & Hall/CRC, pp. 877-892, 2004.

Non-patent document 2: G. Shalchnarovich, T. Darrell and P. Indyk Eds., Nearest-neighbor methods in learning and vision, The MIT Press, 2005.

Non-patent document 3: S. Arya, D. M. Mount, R. Silverman and A. Y. Wu, "An optimal algorithm for approximate nearest neighbor searching, "Journal of the ACM, vol. 45, no. 6, pp. 891-923, 1998.

Non-patent document 4: M. Datar, N. Immorlica, P. Indyk and V. S. Mirrokni, Locality-sensitive hashing scheme based on p-stable distributions, Proc. of the 20th annual symposium on Computational Geometry, pp. 253-262, 2004.

Non-patent document 5: Katayama Norio, Sato Shinichi, "Indexing Technique for Similarity Retrieval", IPSJ Journal of Information Processing Society of Japan vol. 42, no. 10, pp. 958-964, Oct., 2001.

Non-patent document 6: Kobayashi Takao, Nakagawa Masaki, "Higher-dimensional Nearest Neighbor Search by Distributed Coding", IEICET Technical report PRMU2006-41, Jun. , 2006.

Non-patent document 7: Wada Toshikazu, "Acceleration Method for Nearest Neighbor Classification based on Space Decomposition" IPSJ Journal vol. 46, no. 8, pp. 912-918, Aug. 2005.

Non-patent document 8: Shibata Tomoyuki, Kato Takekazu, Wada Toshikazu, "K-D Decision tree: An Accelerated and Memory Efficient Nearest Neighbor Classifier" IEICE Transactions (D-II), vol. J88-D-II, no. 8, PP. 1367-1377, Aug. 2005.

DISCLOSURE OF THE INVENTION

Problems to be Solved by the Invention

As with the above-described local descriptor, a technique of representing each object with a vast number of feature vectors is an effective approach to object recognition. However, since the vast number of feature vectors need to be calculated, further reduction in computation time is required. That is, a processing method to achieve a fast object recognition is required.

As disclosed in patent document 1, to devise a method for extracting the features is one of effective approaches to achieve the faster object recognition. On the other hand, a nearest neighbor search technique which uses the features extracted through conventional techniques is also one of effective approaches, and such a technique is preferable.

Solution to the Problems

In the case of determining a recognition result through a statistical process, as with the case of using the nearest neighbor classifier, a feature vector at a nearest point need not be obtained with respect to each of the feature vectors, provided that an image corresponding to each feature vector can be identified. Further, erroneous matching to a feature vector of another object is acceptable, provided that the number of votes for correct answers eventually exceeds that for errors. Therefore, at the expense of accuracy in retrieving the feature vector, a significantly approximate nearest neighbor searching is performed, whereby it is possible to improve processing time.

Based on the above-described idea, the inventors have invented the present invention.

The present invention provides:

(1) an image recognition method for identifying, when an image representing an object is provided as an input image, an image including the object from an image database through retrieval of local descriptors, the image recognition method including the steps of: extracting a plurality of local descriptors indicative of local features of the input image; limiting local descriptors obtained from images in the image database down to target local descriptors to be retrieved from each of the plurality of local descriptors in the input image; retrieving such local descriptors from the target local descriptors that are respectively near to the local descriptors in the input image so as to specify the retrieved local descriptors as neighbor local descriptors respectively corresponding to the plurality of local descriptors in the input image; and identifying an image to be a recognition result (recognition-result-image), from among images which include the specified neighbor local descriptors, through a statistical process, wherein: the limiting step limits the number of the target local descriptors to the number such that the recognition-result-image is identifiable; and each of the steps is executed by computer.

Further, from another viewpoint, the present invention provides:

(2) an image recognition device for identifying, when an image representing an object is provided as an input image, an image including the object from an image database through retrieval of local descriptors, the image recognition device comprising: a feature extraction section which extracts a plurality of local descriptors indicative of local features of the input image; a limiting section which limits local descriptors obtained from images in the image database down to target local descriptors to be retrieved from each of the plurality of local descriptors in the input image; a retrieving section which retrieves such local descriptors from the target local descriptors that are similar to each of the local descriptors in the input image so as to specify the retrieved local descriptors as neighbor local descriptors respectively corresponding to the plurality of local descriptors in the input image; and an identifying section which identifies at least one image to be a recognition result (recognition-result-image), from among images which include the specified neighbor local descriptors, through a statistical process, wherein the limiting section limits the number of the target local descriptors to the number such that the recognition-result-image is identifiable.

From still another viewpoint, the present invention provides:

(3) an image recognition program for performing with use of a computer, when an image representing an object is provided as an input image, a function of identifying an image including the object from an image database through retrieval of local descriptors, the program ensuring the computer functioning as: a feature extraction section which extracts a plurality of local descriptors indicative of local features of the input image; a limiting section which limits local descriptors obtained from images in the image database down to target local descriptors to be retrieved from each of the plurality of local descriptors in the input image; a retrieving section which retrieves such local descriptors from the target local descriptors that are similar to each of the local descriptors in the input image so as to specify the retrieved local descriptors as neighbor local descriptors respectively corresponding to the plurality of local descriptors in the input image; and an identifying section which identifies at least one image to be a recognition result (recognition-result-image), from among images which include the specified neighbor local descriptors through a statistical process, wherein the limiting section limits the number of the target local descriptors to the number such that the recognition-result-image is identifiable.

Further, another aspect of the present invention provides:

(4) an image recognition method for recognizing, in accordance with a pattern of an object included in an input image, an image including the object from images in an image database which is structured by using a hash table, the method including the steps of: extracting at least one feature vector representing one of the local features of the pattern; calculating indices in the hash table by using the extracted feature vector; determining candidate images in the image database by referring to the hash table using each of the calculated indices and voting for the determined candidate images; and obtaining a recognition-result-image in accordance with a voting result relating to each of the feature vectors, wherein the hash table is prepared based on the steps including: calculating each of the indices in the hash table with respect to each of the feature vectors extracted from the respective images registered in the image database, excluding such feature vectors that have low discriminability from the feature vectors, and registering image reference data each corresponding to the remaining feature vectors.

From still another viewpoint, the present invention provides;

(5) an image recognition device for recognizing, in accordance with a pattern of an object included in an input image, an image including the object from images in an image database which is structured by using a hash table, the device including: a feature point extraction section which extracts at least one feature vector representing one of the local features of the pattern; an index calculation section which calculates indices in the hash table by using the extracted feature vector; a voting section which determines candidate images in the image database by referring to the hash table using each of the calculated indices and votes for the determined candidate images; and an image selection section which obtains a recognition-result-image in accordance with a voting result relating to each of the feature vectors, wherein the hash table is prepared based on the steps including: calculating each of the indices in the hash table, while taking variation in the local features into account, with respect to each of the feature vectors extracted from the respective images registered in the image database, excluding such feature vectors that have low discriminability from the feature vectors, and registering image reference data each corresponding to the remaining feature vectors.

Effect of the Invention

According to the image recognition method according to (1) of the present invention, the limiting step limits the number of retrieval targets to a level which may cause the recognition-result-image to be identifiable. Accordingly, it is possible to reduce a processing time required for the image recognition. In other words, the object can be recognized faster.

Further, In the image recognition device according to (2) of the present invention, the limiting section limits the number of targets to be retrieved to a level which may cause the recognition-result-image to be identifiable. Accordingly, it is possible to reduce processing time required for the image recognition.

Still further, in the image recognition program according to (3) of the present invention, the limiting section limits the number of targets to be retrieved to a level which may cause the recognition-result-image to be identifiable. Accordingly, it is possible to reduce processing time required for the image recognition.

In the image recognition method according to (4) of the present invention, the feature vectors each having low discriminability are excluded, and the only image reference data that corresponds to each of the feature vectors having high discriminability is registered in the hash table. Therefore, the feature vectors each having the high discriminability only are to be processed, and accordingly, it is possible to perform the image recognition in a shorter time. Further, since only the image reference data that corresponds to each of the feature vectors having the high discriminability is registered in the hash table, it is possible to save an amount of memory used for the image database compared to a case where the image reference data corresponding to all the feature vectors is stored.

Still further, in the image recognition device according to (5) of the present invention, since the only the image reference data that corresponds to each of the feature vectors having the high discriminability is registered in the hash table, it is possible to perform the image recognition in a shorter time by processing the image reference data only. Further, since only the image data that corresponds to each of the feature vectors having the high discriminability is registered in the hash table, it is possible to save the amount of memory for the image database.

Regarding the exclusion of the feature vectors, a concept thereof will be described in detail. The image recognition method according to the present invention recognizes the image by using the feature vectors. Basically, the recognition corresponds to matching between each feature vector of the input image and each feature vector registered in the database. The feature vector represents the local feature of the image, and thus a plurality of the feature vectors is obtained from one image, in general. However, among the feature vectors of the object (the image) registered in the database, some of the feature vectors better represents the feature of the object (having high discriminability), and the other feature vectors do not represent the feature (having low discriminability). The feature vector better representing the feature of the object can be a sufficient evidence which ensures correct matching between the input image and the object. On the other hand, such a feature vector that does not better represent the feature will appear in images each representing various objects, and thus cannot be used as the evidence for correct matching. The exclusion of the feature vectors means a process to delete the latter vectors, namely, the feature vector which cannot be the evidence. More specifically, the process is performed as follows:

i) the number of similar feature vectors is calculated; and
ii) feature vectors which exceed a given threshold are regarded as unnecessary feature vectors. Accordingly, the feature vectors each having low discriminability are deleted.

Hereinafter, a preferred embodiment of the present invention will be described.

In the image recognition method according to (1), the limiting step may vary a degree of limit of the retrieval targets in accordance with the input image in order to correctly recognize a recognition-result-image. That is, a degree of approximation may be varied depending on the input image. In this manner, the degree of approximation used for the recognition is changed depending on the input image, whereby it is possible to reduce the processing time, i.e. possible to increase efficiency.

In the object recognition using the approximate nearest neighbor searching, the degree of approximation is an important parameter to balance the recognition rate and the efficiency. When the approximation is rougher, it is possible to reduce the processing time. However, when the approximation is too rough, the nearest neighbor vectors cannot be obtained with respect to the large number of feature vectors, and as a result, a recognition error will be caused. A problem here is that the degree of approximation which causes the recognition error varies depending on the input images. Some input images are "simple" and can be recognized even if a significant approximation is performed, whereas other input images are "complicated" and will be recognized erroneously when the significant approximation is used. To maintain a recognition rate at a predetermined level by using a fixed degree of approximation, the degree of approximation needs to be adjusted to a level that allows such complicated images to be recognized, which disturbs improvement in efficiency.

Therefore, as one preferred embodiment, provided is a technique for simplify processing, based on a viewpoint that "the accuracy of the nearest neighbor searching necessary for the image recognition varies depending on the input images". That is, a technique of adjusting the degree of approximation is provided so as to be adaptable to respective input images. According to the technique, a plurality of recognizers corresponding to different degrees of approximation, respectively, are prepared, and the recognizers are connected to each other in cascaded manner so as to form a cascaded connection in order from that for a rough approximation to that for a close approximation. Accordingly, such an image that can be recognized easily can be recognized quickly with the recognizer for a rough approximation in an earlier stage. On the other hand, for only those images which cannot be recognized by the recognizers for rough approximations, time is taken to perform a precise recognition by using the recognizer for a close approximation in a later stage.

Further, when the recognition-result-image is not identifiable, the limiting step may lower the degree of limit of the target local descriptors, and determine new target local descriptors by excluding the target local descriptors which were previously used; and the determined target local descriptors may undergo the retrieving step and the identifying step. In this manner, even in the case where the limiting step, the retrieving step, and the identifying step are performed in cascaded manner by using various degrees of approximation, the recognition can be performed in comparable processing time to a case where each of the steps are performed without the cascaded manner.

A feature of the technique is a method for configuring the cascaded recognizers. The recognizer in the later stage only performs distance calculations with respect to a part of the retrieval targets resulting from different degrees of approximations. That is, in the stage, such feature vectors that have not been calculated by the recognizers in the stages prior thereto are set as targets of the distance calculation. Therefore, it is advantageous that even in the case where the processing proceeds to a last stage, the computational complexity required for the case is approximately the same as a case where only the recognizer in the last stage is used.

Further, in the case where a recognition target image cannot be recognized even if the degree of limit of the retrieval targets arc lowered on a step-by-step basis, and the limiting step, the retrieving step, and the identifying step are repeated, a retrieved result for each of the plurality of local descriptors may be rejected. Accordingly, it is possible to reduce a recognition error rate as compared to a case without rejection.

Further, the image database may include a hash table which is obtained by classifying respective local descriptors with use of index values thereof calculated through a predetermined procedure, the local descriptors being extracted from the images in the image database. The limiting step may calculate, through the predetermined procedure, index values of each of the plurality of local descriptors in the input image, while taking variation in features into account (calculating stage); refer to bins of the hash table by using each calculated index values; and regard such local descriptors that are classified in the bins as the target local descriptors. The identifying step may perform a statistical process for voting for the images which include the neighbor local descriptors specified by the retrieving step. The hash table may be prepared such that, when the number of the local descriptors classified in the same bin of the hash table exceeds a threshold, the local descriptors in the same bin are excluded from the retrieval targets. Accordingly, the hash table may be prepared such that when the number of the local descriptors classified in the same bin of the hash table exceeds the threshold, the local descriptors are excluded from the retrieval targets. Therefore, in the limiting step, the local descriptors, which are to be retrieval targets, are limited to only such local descriptors that have high discriminability, and thus efficient recognition can be realized.

In the case where there are a large number of local descriptors (feature vectors) sharing one index of the hash table, the local descriptors have low discriminability. That is, when an index value is calculated from local descriptors of an input image, and the hash table is referred to, many candidates belonging to the index are registered therein. Such local descriptors do not contribute to narrowing down of candidates for the image recognition. When such local descriptors that have low discriminability are excluded from the retrieval target, local descriptors having high discriminability only are used for matching, whereby efficient recognition can be performed.

Further, there may be a case where each of the local descriptors is represented as a vector. In such a case, the calculating stage may be performed in such a manner that a discrete value is obtained by discretion of one of the vector elements of each local descriptor, the discrete value being expanded to such neighbors that cover an error range. The error range may be determined in accordance with the variation of the features. In other words, at the time of calculating the index value, in the case where a range determined by expanding one of the vector elements of the local descriptors to an estimated value of the variation extends over a plurality of discretion intervals, then a plurality of the index values may be calculated by using discrete values corresponding to the respective intervals.

Further, there may be a case where each of the local descriptors is represented as a vector. In such a case, the calculating stage may be performed in such a manner that a discrete value is obtained by discretion of one of the vector elements of each local descriptor, the discrete value being expanded to such neighbors that cover an error range. The error range may be determined in accordance with the variation of the features. In other words, at the time of calculating the index value, in the case where a range determined by expanding one of the vector elements of the local descriptors to an estimated value of the variation extends over a plurality of discretion intervals, then a plurality of the index values may be calculated by using discrete values corresponding to the respective intervals.

For example, in the case where a pattern of an object in the image database is a pattern which is viewed from an angle different from a pattern of the object in the input image, that is, in the case where there is variation in the features therebetween, values of elements of the local descriptors (feature vectors) included in the recognition-result-image are varied from the values of elements of their corresponding local descriptors included in the input image. A hash function calculates the index value, which is a discrete value, from values of elements of (dimensions) the local descriptor in accordance with a predetermined calculation procedure. When the values of the elements of the feature vector vary, it is highly probable that different discrete values will be calculated. Each of the elements of the feature vector is a discrete value which is digitized in one or more predetermined thresholds. Therefore, when an estimated range of variation in a value of each element of a feature vector exceeds one of the discrete thresholds, and extends over a plurality of the intervals, then a plurality of index values are calculated by using discrete values corresponding to respective intervals. Accordingly, it is possible to prevent deterioration in the recognition rate resulting from the variation. In other words, when an element of a feature vector is near to a discrete threshold, an index thereof is calculated while a possibility that the element exceeds the threshold is considered, whereby it is possible to maintain the recognition rate.

Further, the retrieving step may perform calculation of a distance between each of the local descriptors in the input image and local descriptors in the bins which are referred to with use of index values calculated from each of the plurality of local descriptors in the input image, thereby specifying at least one of the local descriptors that are within a predetermined distance, or the local descriptor in the shortest distance.

Alternatively, the retrieving step may regard any of such local descriptors in the hash table as the neighbor local descriptors that are in the bins referred to with use of index values calculated from each of the plurality of local descriptors in the input image. In this manner, retrieval can be performed without distance calculation of the feature vector, and accordingly, it is possible to reduce the processing time required for the retrieval compared to a case of performing the distance calculation.

In the image recognition device according to (2), the limiting section may vary the degree of limit of the target local descriptors in accordance with the input image so that recognition-result-image is identifiable. That is, the degree of approximation may be changed in accordance with the input image. In this manner, the degree of approximation used for recognition is changed in accordance with the image, whereby the processing time can be reduced.

Further, when the recognition-result-image is not identifiable, the limiting section may lower the degree of limit of the target local descriptors, and determine new target local descriptors by excluding the target local descriptors which were previously used; the retrieving section may specify neighbor local descriptors from among the determined target local descriptors; and the identifying section may further identify the recognition-result-image in accordance with the specified neighbor local descriptors. Accordingly, even in the case where the limiting section, the retrieving section and the identifying section perform their processes in a cascaded manner while changing the degree of approximation, the recognition can be performed in comparable processing time to a case where each of the sections perform their process without the cascaded manner.

Further, in the image recognition method described in (1) and (4), the image recognition device described in (2) and (5), and the image recognition program described in (3), the pattern of the object included in one image in the image database may be the pattern which is viewed from an angle different from the pattern of the object in the input image.

Further, in the image recognition method described in (1) and (4), the image recognition device described in (2) and (5), and the image recognition program described in (3), the pattern of the object included in one image in the image database may partially correspond to the object in the input image.

The various types of preferred embodiments described herein may be applied in a combined manner. Preferred embodiments of the present invention will be further described, hereinafter.

In the image recognition method according to (4) of the present invention, the exclusion of the feature vectors having low discriminability may be a process, in which in the case where there are more than a predetermined number of feature vectors belonging to a common index, the feature vectors belonging to the index are excluded from targets to be registered in the hash table. When a large number of feature vectors are to be registered in one index in the hash table, the feature vectors are regarded as having low discriminability. That is, when an index is calculated from feature vectors extracted from an input image, and a hash table is referred to by using the calculated index, a large number of candidate are registered in the index. Such an index does not contribute to narrowing down of images to be retrieved. Therefore, the feature vectors corresponding to the index are excluded from registration in the hash table. Accordingly, only local descriptors having high discriminability can be registered in the hash table.

Further, the step for index calculation may calculate the indices obtained by discretizing respective elements of a feature vector so that the indexes cover estimated error ranges of the elements. That is, at the time of the index calculation, in the case where a range determined by expanding one of the vector elements of the local descriptors to an estimated value of the variation extends over a plurality of discretion intervals, then a plurality of the index values may be calculated by using discrete values corresponding to the respective intervals.

For example, in the case where a pattern of an object in an image in the image database is a pattern viewed from an angle different from the pattern of the object in an input image (in the case of variation), values of the feature vector elements included in the image in the image database, i.e., the recognition-result-image, vary from those included in the input image.

In the index calculation step, the values of the elements of a feature vector are digitized based on the thresholds. Under a condition where values of the elements of the feature vector, stay in the vicinity of the thresholds, when there is a variation in the values, the values of the elements are highly likely to be digitized to a different discrete value as a result of the discretization. Therefore, when the estimated error range of the values of the elements of the feature vector extends over a plurality of intervals for discrete values, then a plurality of indices is calculated by using discrete values corresponding to the intervals, whereby it is possible to prevent deterioration in the recognition rate resulting from the variation.

In other words, when an element of a feature vector is close to a threshold of discretization used for calculating indices, the indices are calculated while a possibility that the value of the element will exceed the threshold is taken into account. Accordingly, the recognition rate can be maintained.

Further, the image reference data to be registered in the hash table may include an image ID for recognizing images including feature vectors in the database, and elements of the feature vectors. In this case, the voting step performs distance calculation between respective feature vectors of an input image and respective feature vectors which are calculated based on those in the input image and are registered in indices in the hash table, and then performs voting for an image which is identified to have an image ID of a feature vector of the nearest distance. Further, in this case, the voting may be performed only in the case where the nearest distance is equal to or less than a predetermined threshold. In this manner, the number of times of the distance calculation of feature vectors is limited to such a number of feature vectors that are registered in the index, and thus it is possible to reduce the number of times of the distance calculation.

Alternatively, the image reference data registered in the hash table may include image IDs for recognizing images including feature vectors in the database. In this case, the voting step may perform voting for such an image that is identified to have image IDs, which are calculated from feature vectors of the input image and registered in indices of the hash table. Accordingly, only the image IDs are registered in the hash table, and elements of the respective feature vectors need not be registered, and thus it is further possible to save a memory of the image database. Further, with respect to each of the feature vectors in the input image, identification is performed simply by referring to the hash table using the calculated indices and by performing voting using the image IDs registered in the respective indices. Accordingly, compared to a case of performing the distance calculation, it is possible to further reduce the computation time.

In the image recognition device of the present invention described in (5), the exclusion of the feature vectors having low discriminability may be a process in which in the case where there are more than a predetermined number of feature vectors belonging to a common index, the feature vectors belonging to the index are excluded from registration in the hash table.

Further, the index calculation section may calculate an index such that discrete values which satisfy an estimated error range are included in discrete values which are obtained by discretizing respective elements of a feature vector. In other words, a range of values, which is calculated based on values of the elements of the feature vector and the estimated variation values, extends over a plurality of intervals, then a plurality of indices may be calculated by using the discrete values corresponding to the respective intervals.

The image reference data registered in the hash table may include image IDs for recognizing images including the respective feature vectors in the database and elements of the feature vector. In this case, the voting section performs distance calculation between each feature vector in the input image and each feature vector which is calculated based on the feature vector in the input image and is registered in one of the indices of the hash table, and performs voting for such an image that is identified to have an image ID of a feature vector having a nearest distance. In this case, voting may be performed only in the case where the nearest distance is equal to or less than a predetermined threshold.

Alternatively, the image reference data registered in the hash table includes the image IDs for identifying images including the respective feature vectors in the database, and the voting section may vote for such an image that is identified to have an image ID that is calculated from each feature vector in the input image and is registered in an index in the hash table.

The various types of preferred embodiments described herein may be applied in a combined manner.

BRIEF DESCRIPTION OF THE DRAWINGS

FIG. 4 is a diagram showing exemplary registered images used in an experiment according to the present invention.

FIG. 5 is a diagram showing exemplary query images used in an experiment according to the present invention.

Figure 1:
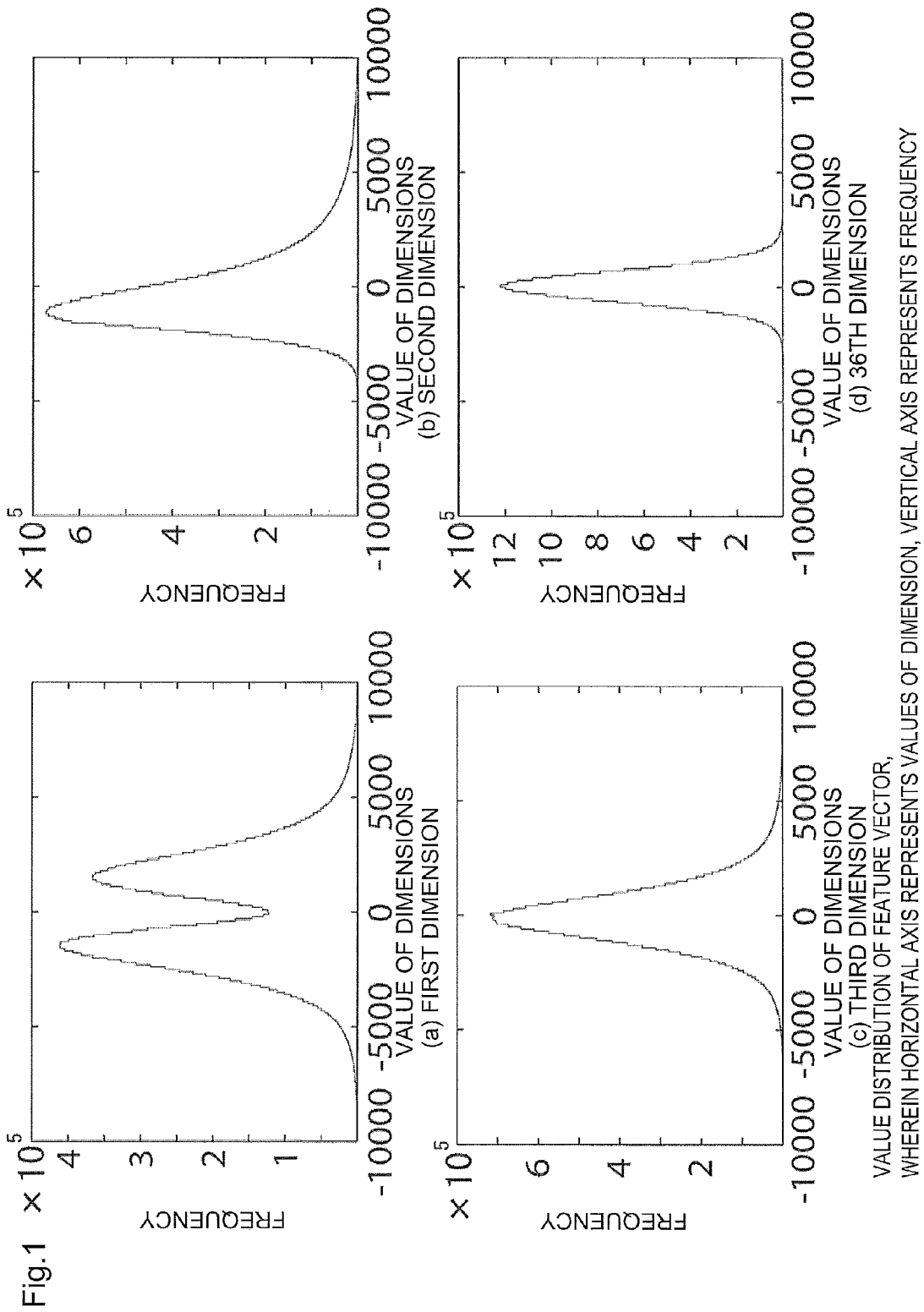
FIG. 1 shows graphs each showing value distributions of feature vectors obtained based on a conventional PCA-SIFT technique.

DESCRIPTION OF THE REFERENCE CHARACTERS 10 recognizer
11 feature point extraction section
13 index calculation section
15,35 image database
16 temporary nearest neighbor database
17,37 hash table
19 voting section
21 voting table 23 image selection section
24 reliability determination section
38 feature point matching section

BEST MODE FOR CARRYING OUT THE INVENTION

Hereinafter, the present invention will be described with reference to drawings. The description below is merely an example, and should not be deemed to limit the present invention.

In the present embodiment, a technique of gradually adjusting a degree of approximation (a cascading technique) in accordance with an input image will be described first. In respective cascaded stages, recognizers each performs a process of recognizing an image corresponding to an input image. The recognizer performs a limiting step, a retrieving step, and an identifying step as claimed in the method claims attached hereto. The recognizer also corresponds to a limiting section, a retrieving section, and an identifying section as claimed in the product claims and program claims attached hereto.

Next, a configuration of the recognizer will be described in detail.

(Cascading Technique)
1. Configuration and Settings

When an image is represented with a plurality of feature vectors and recognized through approximate nearest neighbor searching and through voting of the feature vectors, the performance cannot exceed a recognition rate obtained in the case where approximation is not performed. If the approximation is performed, speeding up can be realized, whereas the recognition rate is lowered generally. As described above, the relation between the degree of approximation and the recognition rate varies depending on an image to be recognized, and thus in order to reduce processing time while maintaining the recognition rate, the degree of approximation needs to be adjusted adaptively.

A problem is that it is difficult to estimate the degree of approximation necessary for recognition, before the recognition is actually performed. In order to overcome the problem, a technique may be considered in which a large number of recognizers having different degrees of approximation are prepared, and outputs from the recognizers are observed so as to select appropriate output results.

Figure 18:
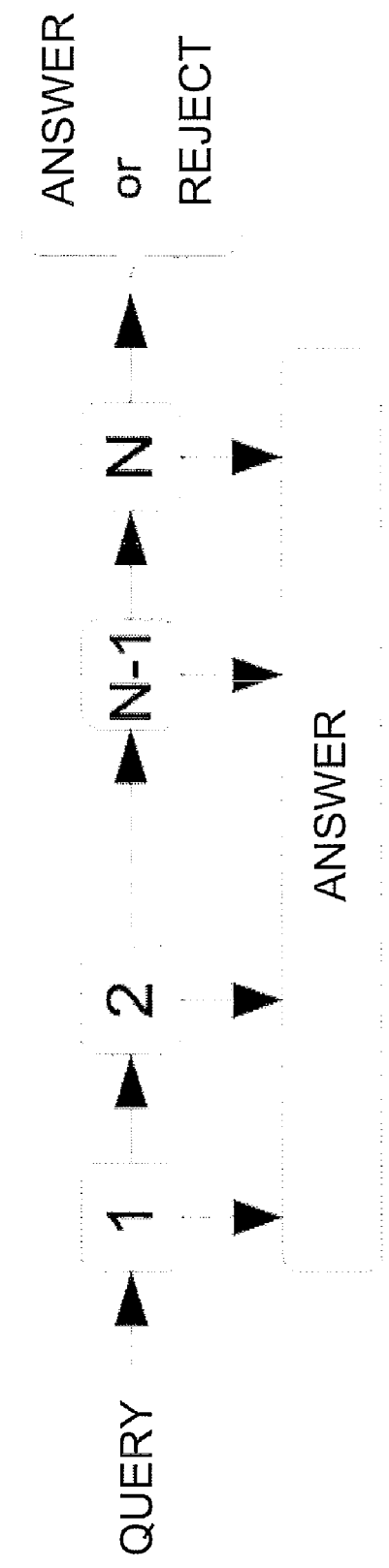
FIG. 18 is a block diagram showing an exemplary configuration according to the present invention, in which recognizers arc connected in cascaded manner.

As a specific technique which uses a plurality of recognizers while maintaining the processing efficiency, a configuration may be considered in which recognizers based on approximate nearest neighbor searching are connected in cascaded manner. FIG. 18 is a block diagram showing a configuration in which the recognizers are connected in cascaded manner.

Here, rectangles including figures from 1 to N, respectively, represent recognizers, and those rectangles having lower numbers represent stronger approximation. A set of feature vectors obtained from an input image, which is a query image, is recognized by a recognizer of a first stage. If sufficient evidences can be obtained in the first stage, the reliability determination processing stops the recognition process and outputs a result. On the other hand, if sufficient evidences cannot be obtained, the set of feature vectors are processed by a recognizer in the next stage, which has weaker approximation, for further recognition. When the process is repeated, and the sufficient evidences cannot be obtained even through the process in Nth stage, which is the last stage, then an image having a largest number of voting is replied as the answer, or the image is rejected. Accordingly, for such images with respect to which the process is terminated at an early stage, significant efficiency in the processing time can be expected, and careful recognition with more processing time may be also possible as needed.

The following two methods are requirements for using the above-described configuration:
<1> a method for determining whether or not to terminate the processing; and
<2> a method for maintaining efficiency in the processing time even in the case of a "complicated" image.

Regarding to <1>, it is preferable that the determination is made as accurately as possible with less computational complexity. <2> is a measure to prevent lowering of the process efficiency even in the case of such an image that requires repetition of the recognition process until later stages. Preferably, the computational complexity required in the case where the process is repeated by cascaded recognizers and proceeds to sth stage should be equal to the computational complexity required in the case where a single recognizer having the same degree of approximation as a recognizer in the sth stage is used. Hereinafter, each of the methods will be described.

2. Method for Determining Whether or Not to Terminate Processing

Generally, an image, which results in a recognition error, obtains a small number of votes, in the first place. Alternatively, even in the case where such an image obtains a relatively large number of votes, the number of votes is very close to that of a second candidate. In this regard, as a process performed by the reliability determination section, a simple determination method using the number of votes as described below may be considered. Under a condition where a largest number of votes is $V_1$, and a second largest number of votes is $V_2$, and when $V_1 > t$ and $rV_1 > V_2$ are satisfied simultaneously, the process is terminated, and an image having the largest number of votes is replied as the answer. Here, t represents a threshold of the number of votes, and r represents a threshold of a ratio between the largest number of votes and the second largest number of votes. In the last stage, two cases may be considered, that is, a case where an image receiving the largest number of votes is regarded as the retrieval result regardless of the above-described formulas, and a case where recognition is rejected when the formulas are not satisfied.

3. Method for Maintaining Processing Efficiency Even in Case of "Complicated" Image Hereinafter, considered will be N pieces of approximate nearest neighbor searchers 1 to N (hereinafter simply referred to as searcher(s)) respectively having different degrees of approximation. The degree of approximation of the searcher (s−1) is stronger than that of the searcher s. Suppose a case where approximate nearest neighbor searching is performed with respect to a feature vector $q_i$ by using the searcher s, and as a result, a set of feature vectors $P_i^{(s)}$ is obtained as targets of distance calculation. In the approximate nearest neighbor searching, as the degree of approximation is getting stronger, the number of the feature vectors to be the targets of the distance calculation is getting fewer. That is, $|P_i^{(s)}| \geq |P_i^{(s-1)}|$ is satisfied regardless of the values of i and s, respectively.

Here, the following two characteristics of the searchers will be considered.

Definition 1. Monotonicity

When the following formula is satisfied with respect to any values of i and s, the approximate nearest neighbor searchers is regarded to have monotonicity.

$$P_i^{(s)} \supseteq P_i^{(s-1)} \tag{1}$$

Definition 2. Difference Searchability

When the approximate nearest neighbor searcher can efficiently calculate a different set as represented below, the searcher is regarded to have difference searchability.

$$P_i^{(s)} - P_i^{(s-1)} \tag{2}$$

When the cascaded recognizers shown in FIG. 18 is composed of the searcher having the monotonicity, then $P_i^{(s)} - P_i^{(s-1)}$, which is a difference between the sth stage and a (s−1)th stage, is used as a target of the distance calculation or of the voting, instead of $P_i^{(s)}$. In such a configuration, a sum of sets of the feature vectors, which have been targets of the distance calculation or of the voting performed between the first stage and the sth stage, corresponds to the set $P_i^{(s)}$ of a case where the searcher s is used solely. Therefore, the number of times of the distance calculation or of the voting is identical between both of the cases. Further, when the searcher has the difference searchiability, it is possible to prevent an increase in the computational complexity even if cascading is performed.

Figure 23:
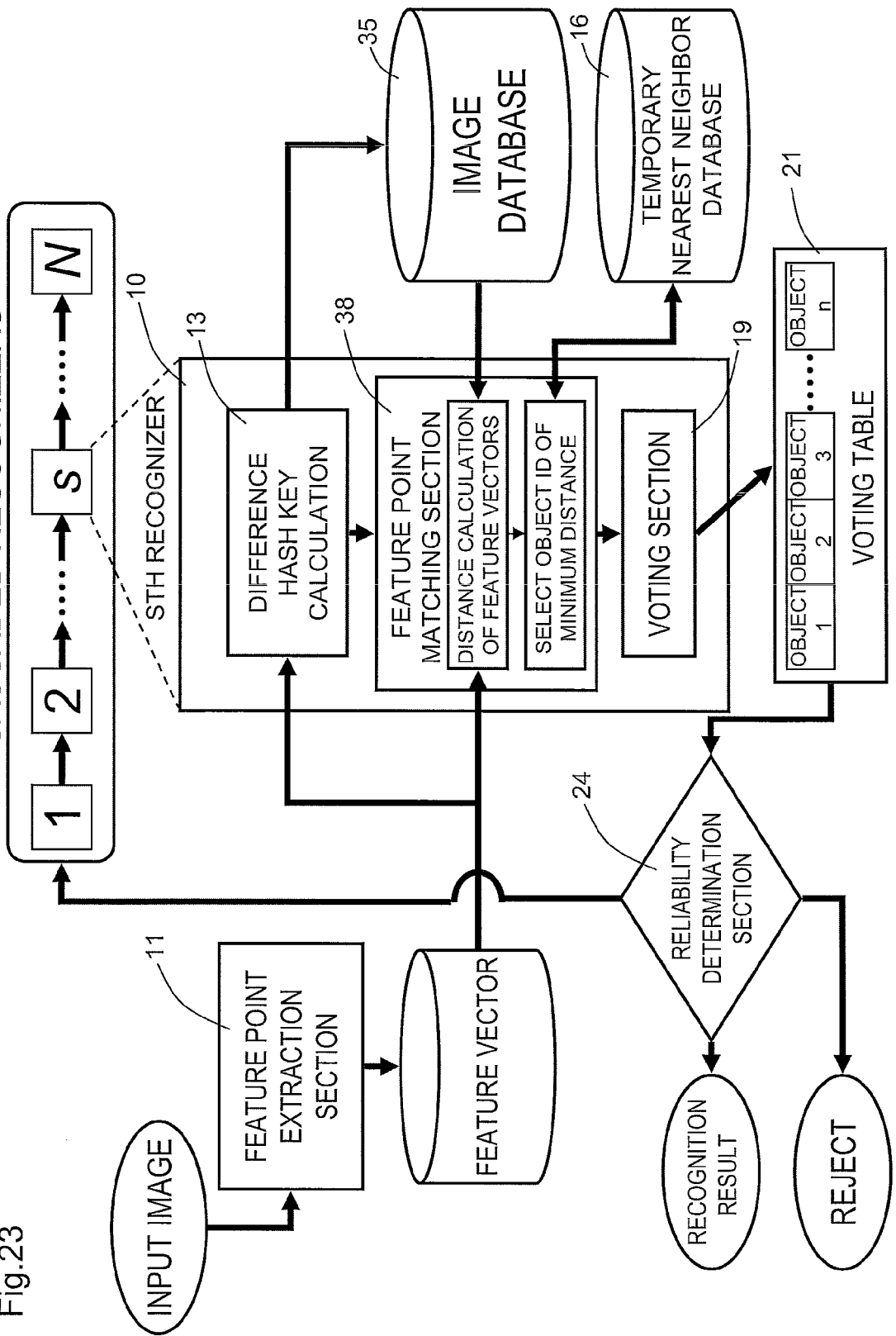
FIG. 23 is a block diagram showing an image recognition device according to the present invention in which the recognizers which performs the distance calculation are connected in cascaded manner.

A recognition process in the case where the distance calculation is used will be described in detail with reference to FIG. 23. Blocks in a frame denoted by reference number 10 in FIG. 23 represent a detailed configuration of a recognizer in each stage constituting cascaded recognizers. When the process proceeds to the (s−1)th stage, temporary nearest neighbors $p_i^*$ are found with respect to respective feature vectors $q_i$, and are registered in a temporary nearest neighbor database 16. Therefore, in the sth stage, difference feature vectors, which are each represented as $p_i \in (P_i^{(s)} - P_i^{(s-1)})$, are obtained through difference hash key calculation, and the distance calculation between the difference feature vectors and the feature vectors $q_i$ is performed. When such difference feature vectors that are closer in distance than the temporary nearest neighbors $p_i^*$ are found, such vectors are newly registered as temporary nearest neighbors $p_i^*$ in the temporary nearest neighbor database 16, and voting may be performed again.

A recognition process in the case where the distance calculation is not used will be described in detail with reference to FIG. 24. When the process proceeds to the (s−1)th stage, voting is completed by hash keys obtained with respect to respective feature vectors $q_i$ prior to the stage. Therefore, in the sth stage, difference feature vectors which are represented as $p_i \in (P_i^{(s)} - P_i^{(s-1)})$, are obtained through the difference hash key calculation, and voting may be additionally performed only with respect to the difference feature vectors.

Figure 24:
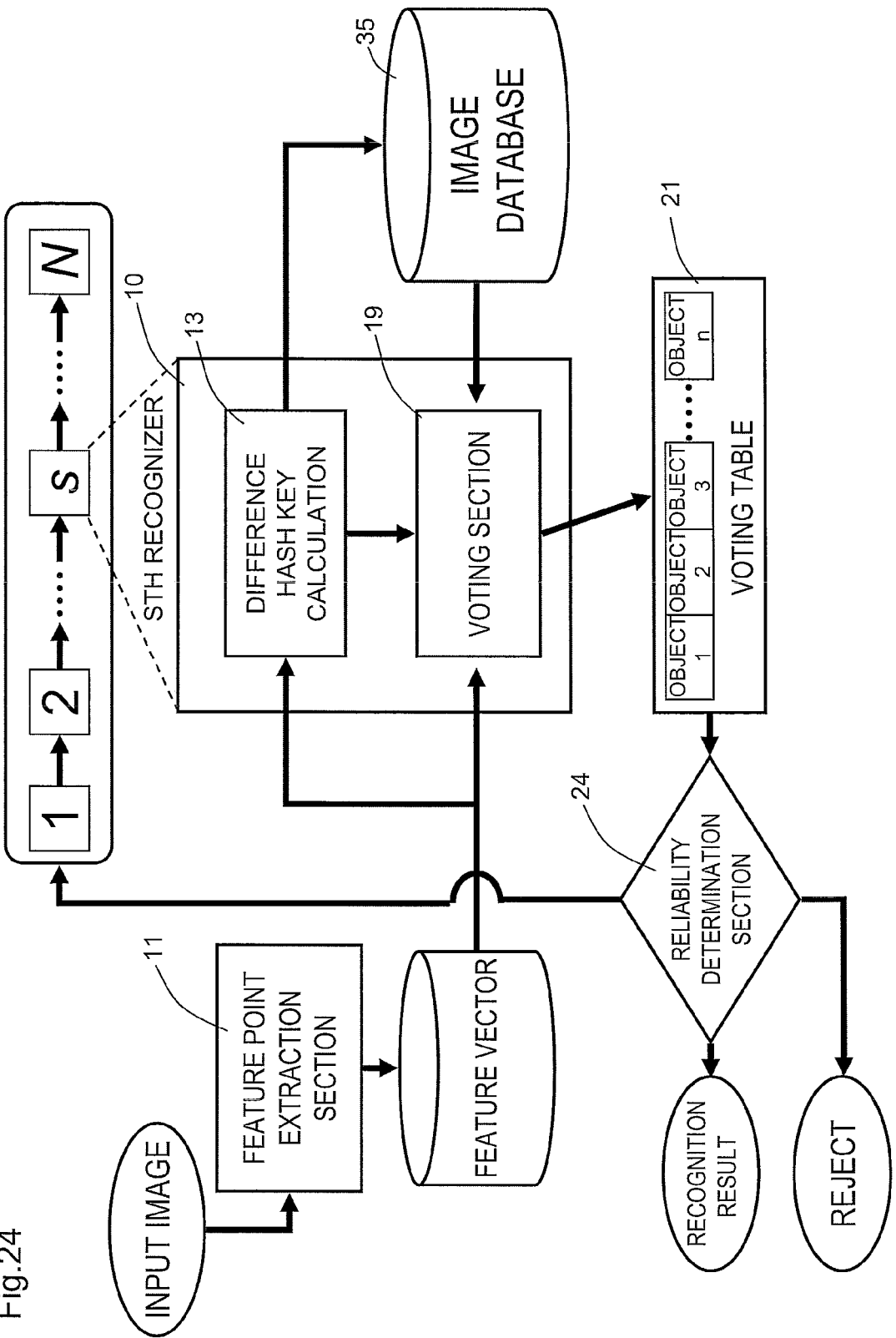
FIG. 24 is a block diagram showing an image recognition device according to the present invention in which the recognizers which does not perform the distance calculation are connected in cascaded manner.

Blocks in a frame denoted by reference number 10 in FIG. 24 represent a detailed configuration of the recognizer in each stage constituting the cascaded recognizers. Further, the reliability determination section 24 shown in each of FIGS. 23 and 24 includes a function of the image selection section 23 shown in FIGS. 15 and 16. When sufficient reliability has been obtained from voting results performed until the sth stage, the reliability determination section 24 determines an image to be a retrieval result (corresponding to the function of the image selection section 23). On the other hand, when sufficient reliability cannot be obtained, the reliability determination section 24 determines to further proceed to the subsequent (s+1)th stage. When sufficient reliability cannot obtained until the last stage (Nth stage), the result is determined to be rejected.

(Configuration of Recognizer)

As the recognizer, a technique based on the following notion will be provided. In the present embodiment, a PCA-SIFT will be used for a local descriptor. As a nearest neighbor search technique using the PCA-SIFT, the inventors propose a technique, i.e., one of the aspects of the present invention, which is faster than the conventional ANN and LSH techniques. The nearest neighbor search technique disclosed by the inventors has the monotonicity and the difference searchability as described later, and thus is suitable for cascading. Accordingly, a configuration, in which the technique disclosed by the inventors is used as the recognizers, will be described later in an embodiment using the cascading.

The technique based on the cascading is not limited to such a configuration which is combined with the technique disclosed by the inventors. Provided that the technique satisfies the monotonicity and the difference searchability, a certain level of effect can be obtained even with the use of recognizers based on the conventional nearest neighbor search techniques. For example, the monotonicity may be satisfied with the ANN or the LSH techniques. With the ANN, the monotonicity is satisfied when the value of an allowable error ϵ to be described later is changed gradually, whereas, with the LSH, the monotonicity is satisfied when the number L of hash tables to be retrieved is increased gradually. That is, even with the use of the recognizer based on the conventional technique, it may be possible to reduce processing time necessary for object recognition provided that the recognizers in cascaded manner are used rather than a recognizer in a single stage. The technique, which is disclosed by the inventors and is to be applied to the recognizer, is not necessarily based on the cascading. Even with a recognizer in a single stage, it is possible to reduce the processing time compared to the recognizer based on the conventional technique. However, when the recognizers having the technique of the present invention applied are arranged in cascaded manner, faster object recognition can be realized. Therefore, combination of both is most preferable.

In the inventors' technique applied to the recognizers is divided into a technique of performing distance calculation in the last stage of the approximate nearest neighbor searching (technique with distance calculation) and a technique without performing the distance calculation (technique without distance calculation). Hereinafter, data registration which is common to the technique with distance calculation and to the technique without distance calculation will be described, and then the respective techniques and the method of cascading will be described.

The inventors disclose two types of techniques using the hash table to realize speeding up.

One of the techniques to realize the speeding up is a method to decrease the number of distance calculations of feature vectors. Specifically, in the case where the distance calculation needs to be performed many times since there are many neighbor feature vectors, such feature vectors are discarded, whereby the speeding up is achieved. Hereinafter this type of technique is referred to as the technique with distance calculation. The other technique does not perform any distance calculation. Instead, the technique performs only voting after subtracting the hash table. Hereinafter, this type of technique is referred to as the technique without distance calculation.

According to the present embodiment, in the process of recognizing an object captured by a camera, specifically, in a method for recognizing an object using local descriptors, it is possible to reduce computation time required for the recognition process compared to conventional art. Alternatively, it is possible to perform a process with a lesser amount of memory compared to conventional art.

Further, according to the present embodiment, compare to a case where the conventional approximate nearest neighbor searching method such as the ANN or the LSH is used, a shorter computation time is required to achieve the same recognition rate as the conventional case. According to an exemplary experiment described later, the computation time is reduced to a half or one third of that of the conventional technique. Further, the technique without distance calculation also excels in scalability since a lesser amount of memory is required.

(Outline of Configuration)

Figure 15:
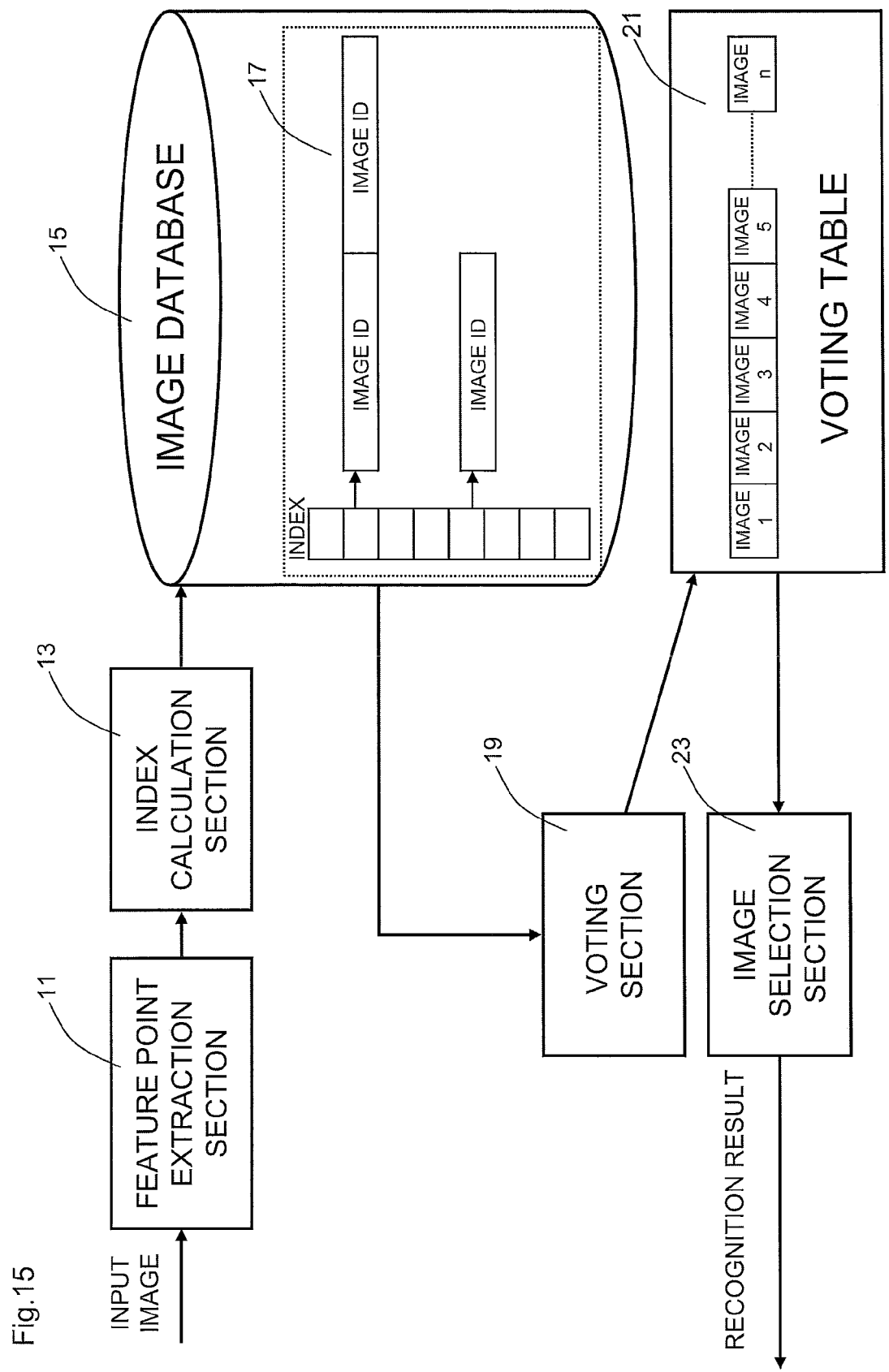
FIG. 15 is a block diagram showing an exemplary configuration of an image recognition device of the present invention, which uses the technique without distance calculation.
Figure 16:
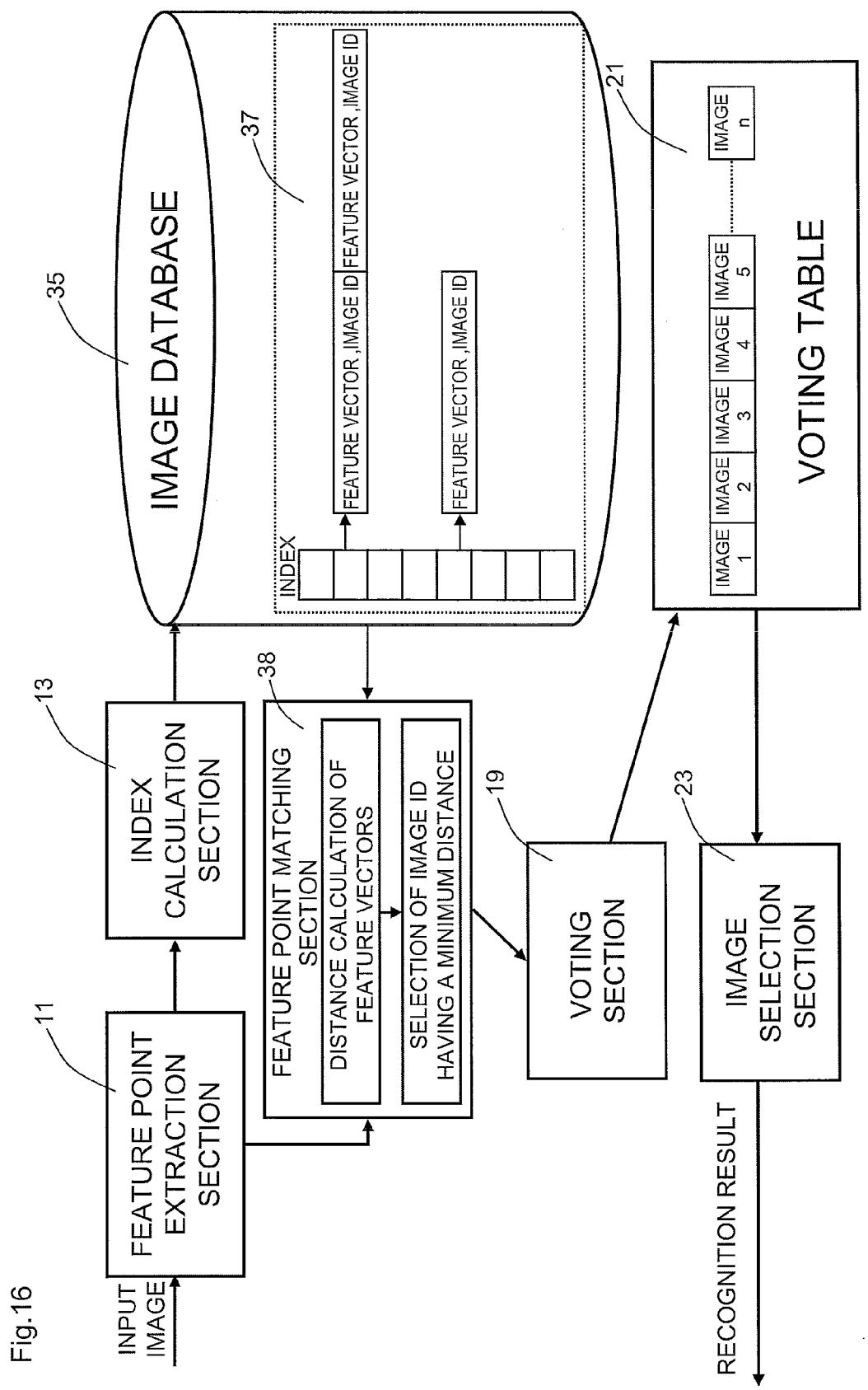
FIG. 16 is a block diagram showing an exemplary configuration of an image recognition device of the present invention, which uses the technique with distance calculation.

FIGS. 15 and 16 are block diagrams each showing an exemplary configuration of an image recognition device according to the present invention. FIG. 15 is a block diagram corresponding to the technique without distance calculation, whereas FIG. 16 is a block diagram corresponding to the technique with distance calculation. The image recognition method of the present invention is executed on the image recognition device. Hardware of the image recognition device is composed of, for example, a CPU, a storage device such as a hard disc device having stored thereon a program indicative of a processing procedure executed by the CPU, a RAM providing a work area to the CPU, and an input/output circuit for inputting/outputting data. More specifically, a personal computer having the above-described components may be used. Alternatively, in another embodiment, the hardware may be composed of a built-in type device which includes a large-scale integration (LSI), a hard disc device, and a microcomputer for controlling processing thereof.

As shown in FIG. 15, a feature point extraction section 11 is a block for extracting feature vectors from a pattern of an object included in an input image. An index calculation section 13 calculates indices in a hash table from the feature vectors in accordance with a predetermined calculation method. In an image database 15, a plurality of images having image IDs is registered. Further, the image database 15 also has a hash table 17 for referring to images therein.

In the hash table 17, image IDs of images are registered and are correlated with each of the indices. The image IDs are correlated with each of the indices as follows. First, an image of a registration target is processed in the same manner as in the process by the feature point extraction section 11, and feature vectors are extracted therefrom. With respect to each of the extracted feature vectors, each index in the hash table is calculated by using the same calculation method as the index calculation section 13. In the index calculated in this manner, an image ID of an image including the feature vector from which the index is calculated is registered in advance.

The voting section 19 refers to a specific index in the hash table 17, and when the referred index has any image ID registered in the hash table 17, voting for an image having the image ID is performed. For the voting, a voting tale 21 is arranged for storing the number of votes performed with respect to respective images.

The image selection section 23 refers to the voting table 21, and selects an image obtained a largest number of votes.

When the cascading technique is applied to the image recognition device shown in FIG. 15, the index calculation sections 13, the voting sections 19, and the voting tables 21, among respective blocks above described, are arranged in cascaded manner.

In FIG. 16, the function of each of the feature point extraction section 11, the index calculation section 13, the voting section 19, the voting table 21, and the image selection section 23 is the same as that shown in FIG. 15. An image database 35 is different from that shown in FIG. 15 in terms of a configuration of a hash table 37. That is, with respect to each feature vector of registered images, an element of the feature vector and an image ID of an image including the feature vector is paired and registered in the index in the hash table 37. The element of the vector is used for the distance calculation. The image recognition device shown in FIG. 16 includes a feature point matching section 38. When a plurality of the feature vectors are registered in one index, the feature point matching section 38 performs the distance calculation between the feature vectors and the feature vector extracted from the input image, identifies one of the feature vectors that has a nearest distance, and then determines, as a candidate image, an image of an image ID registered together with the feature vector having the nearest distance.

In the case where the cascading technique is applied to the image recognition device shown in FIG. 16, the index calculation sections 13, the voting sections 19, the voting tables 21, and the feature point matching sections 38, among the component blocks above described, are arranged in cascaded manner.

In the image recognition device shown in FIG. 15, voting is preformed for all the image IDs registered in the index referred to, and thus a block corresponding to the feature point matching section 38 is not included.

(Feature Vector)

The feature vector used in the present embodiment will be described.

1. SIFT

An SIFT (Scale-Invariant Feature Transform) is a method for extracting a feature point and a feature vector belonging thereto, and is proposed by Lowe (e.g., see D. G. Lowe, "Distinctive image features from scale-invariant keypoints," International Journal of Computer Vision, vol. 60, no. 2, pp. 91-110, 2004). As the name indicates, the method is robust against scaling and rotation of an image, or perspective distortion. Conventionally, processing time has been regarded as a problem to be solved, however, with the use of the GPU (Graphical Processing Unit), a fast process is achievable.

In the present embodiment, the feature point is extracted by using a software provided by Lowe (see URL: http://www.c-s.ubc.ca/~lowe/keypoints/). The feature vector is a 128-dimensional integer-valued (0-255) vector.

2. PCA-SIFT

Ke et al. proposed a PCA-SIFT in which principal component analysis is applied to the feature vector extracted based on the SIFT, and stability of the SIFT and recognition performance are improved (see Y. Ke and R. Sukthankar, Pca-sift: A more distinctive representation for local image descriptors, CVPR2004, Vol. 2, pp. 506-513, 2004). In the present embodiment, the PCA-SIFT is used for a local descriptor of an image. A feature vector obtained based on the PCA-SIFT is a 36-dimensional real-valued vector. That is, feature vector obtained based on the SIFT is transformed into the 36-dimensional vector by using the software provided by URL: http://www.cs.cmu.edu/~yke/pcasift/.

When the PCA-SIFT is calculated by using an image which is used in an exemplary experiment to be described later, the respective dimensions have value distributions as shown in FIG. 1. FIG. 1 shows graphs each showing distribution of values of the feature vector, wherein a horizontal axis represents a value of the dimension, and a vertical axis represents frequency.

A first dimension shows a double-peaked distribution, and a second dimension and thereafter each shows a single-peaked distribution. Further, the more the value of the dimension is increased, the more the distribution is reduced. In any case, the average value appears in the vicinity of 0.

(Object Recognition and Approximate Nearest Neighbor Searching)

1. Object Recognition Based on Voting

Suppose that there are a large number of images stored in an image database, and each of the images represents one object. When an image to be recognized (hereinafter referred to as a query) is provided, to retrieve an image, which most matches the query, from the database will be defined as a task of the object recognition.

To achieve the task, a voting method is applied in the present embodiment. The image of the query is represented by Q, and an image in the database is represented by P. In addition, d-dimensional feature vectors obtained from Q and P are respectively represented by q and p. When p is obtained as the feature vector corresponding to q as a result of the approximate nearest neighbor searching, 1 vote is cast to the image P. In a similar manner, voting is performed for all the feature vectors obtained from Q, and an image which finally has a largest number of votes is presented as a recognition result.

In this manner, the approximate nearest neighbor searching is performed between each of the feature vectors obtained from the query and feature vectors obtained from all the images in the database. Therefore, to speed up the approximate nearest neighbor searching is important. Prior to description of the present embodiment, the ANN and the LSH, which are the typical conventional techniques, will be described briefly.

2. ANN

The ANN (Approximate Nearest Neighbor) disclosed in non-patent document 3 is a technique which performs fast approximate nearest neighbor searching by using a tree structure. Nodes of the tree correspond to hyperrectangles (hereinafter, referred to as cell(s)) which are obtained by dividing a feature space. The feature vectors are also correlated with the leaf nodes.

Figure 2:
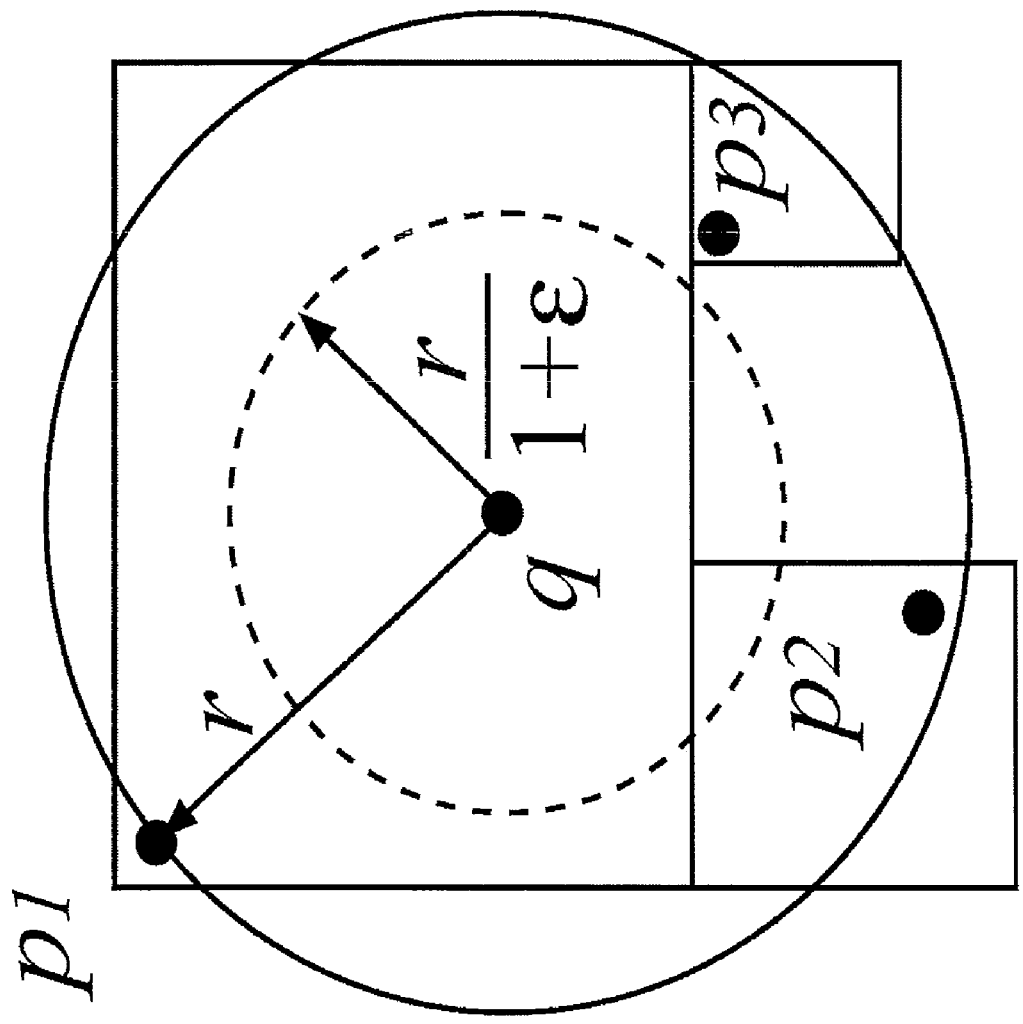
FIG. 2 is a diagram illustrating a notion of approximate nearest neighbor searching based on a conventional ANN technique.

FIG. 2 shows a notion of the approximate nearest neighbor searching based on the ANN. For the sake of simplification, those cells which are irrelevant to the explanation are not shown. Suppose that q represents a query feature vector, $p_1$, $p_2$, and $p_3$ represent feature vectors of images in the database, and $p_1$ is found as a neighbor vector. In the case of performing the nearest neighbor searching, since those cells which overlap with a hypersphere indicated with a solid line are likely to have feature vectors nearer than $p_1$, the cells are to be retrieved. On the other hand, in the case of performing the approximate nearest neighbor searching, hypersphere having a radius of $r/(1+\epsilon)$, which is defined by using an allowable error $\epsilon$, is assumed as compared to the distance between r and $p_1$, and those cells which intersect with the hypersphere are regarded as targets to be retrieved. Accordingly, there is a possibility that the nearest neighbor feature vector ($p_3$ in the case of FIG. 2) cannot be found. However, since the number of cells to be retrieved is decreased, it is possible to reduce a retrieving time.

3. LSH

The LSH (Locality Sensitive Hashing) disclosed in non-patent document 4 is a technique of the approximate nearest neighbor retrieving using the hash table. Here, $E^2$LSH (Exact Euclidean LSH; hereinafter simply referred to as an LSH) will be described.

d-dimensional vectors $p=(x_1, \ldots, x_d)$ will be examined. In the LSH, one feature vector is transformed into L patterns of k-dimensional vectors, which are each registered in corresponding L hash tables. At the time of retrieving, a feature vector q of a query is used to retrieve all the hash tables, and a feature vector, among the obtained feature vectors $p_1, \ldots, p_s$, which has a minimum Euclidean distance from q is obtained as a retrieved result. In this manner, with the use of a plurality of hash tables, the feature vector that is a preferable approximate nearest neighbor can be obtained constantly.

The method will be described in more detail. The process to be performed is common to the feature vector of the query and the feature vectors in the database, and thus the feature vector is generally represented by v. By using L different functions $g_1(v), \ldots, g_L(v)$, which are generated based on the following procedure, v is stored in the corresponding L hash tables. The respective pieces of $g_j(v)$ are used to transform v into the k-dimensional vectors so as to satisfy $g_j(v)=(h_1(v), \ldots, h_k(v))$. $H_i(v)$ is a function to transform v into an integer, and is expressed as follows.

[Formula 1]

$$h_i(v; a_i, t_i) = \left\lfloor \frac{a_i \cdot v + t_i}{w} \right\rfloor \quad (1)$$

Wherein, $a_i$ represents a d-dimensional vectors, each dimension being generated based on normal random numbers, and $t_i$ represents a scalar determined by uniform random numbers of [0,w]. By using the aforementioned values, it is possible to achieve a situation in which the shorter the Euclidean distance between $v_1$ and $v_2$ is, the higher the possibility to achieve $h_i(v_1)=h_i(v_2)$ is.

In the LSH, the k-dimensional vectors are prepared by using k different pieces of $a_i$ and $t_i$, wherein $i=1, \ldots, k$ is satisfied, whereby it is possible to prevent those pieces of v, which each has a large Euclidean distance, from resulting in an identical vector. On the other hand, by using L pieces of $g_j$, it is possible to prevent those pieces of v, which each has a close Euclidean distance, from being excluded from the targets to be retrieved.

The ANN and the LSH, i.e., the typical conventional techniques have been described as above. Next, the technique of the present invention will be described.

(Fast Approximate Neighbor Searching Based on Reduction in Collision)

1. Concepts

When an object is to be recognized through a voting process using feature vectors which represent local features of the object, it is not necessary to find a feature vector which is a nearest neighbor to a query feature vector. Instead, it is only necessary to find whether or not a label of an image attached to the feature vector is correct. Further, since the recognition result is determined by voting, as long as the number of correct votes is not overturned, problems will not occur even if votes are wrongly made for another image. By utilizing such characteristics, significant approximation is performed, whereby faster processing is realized compared to the case with the ANN or with the LSH.

In the case of using the ANN and the LSH, a computation time needs to be taken most for distance calculation between q and p. Therefore, it is important to consider how to reduce the computation time. On the other hand, it will be a problem if the accuracy of retrieving (recognition rate) deteriorates significantly, or if an amount of memory required for retrieving is increased significantly.

In the present invention, a hash function which utilizes characteristics of data is used, whereby problems in speeding up will be overcome. The following two techniques will be considered. One is a method which performs distance calculation, and reduces the number of feature vectors to be retrieved. Specifically, when there are many collisions occurring, that is, when a large number of feature vectors which have an identical hash value are registered, the feature vectors are deleted from the hash table in advance. Accordingly, it is possible to reduce the number of the distance calculation per query feature vector to a given number or lower. The other is a method which does not perform the distance calculation at all. When deletions are performed in accordance with the number of collisions, such feature vectors that are effective for image recognition are left in the hash table. With the use of such feature vectors, it is expected that a correct result can be obtained only through voting.

2. Data Registration

Data registration which is common to two of the techniques according to the present invention will be described. In the LSH which uses the hash table in the same manner as the techniques of the present invention, the more the number of the hash tables is increased, the more the amount of memory is consumed.

In the present embodiment, in order to reduce the amount of memory to be used, only one hash table will be used. Feature vectors are registered in the hash table in accordance with the following method. A first dimension to a dth dimension are selected from 36-dimensional real-valued vectors p, which is obtained by using the PCA-SIFT, so as to satisfy the following formula.

$$\hat{p} = (x_1, x_2, \ldots, x_d) \quad \text{[Formula 2]}$$

$$u_j = 0 \text{ if } x_j < T_0$$

$$u_j = i+1 \text{ if } T_i \leq x_j < T_{i+1} \quad \text{[Formula 3]}$$

Next, based on the above formulas, each of the dimensions is digitized to prepare vectors $u=(u_1, \ldots, u_d)$ which are composed of natural numbers.

[Formula 4]
$$H_{index} = \left(\sum_{i=0}^{d-1} u_i U^{i-1}\right) \bmod H_{size}$$

Based on the above formula, an index of a hash value is calculated, and is registered in the hash table. Here, U represents a type of a discrete value (represented by U-adic number), and $H_{size}$ represents a size of the hash table. Data registered in the hash table varies depending on whether or not a distance is used. When the distance is used, in addition to an image ID for a feature vector p, p per se is registered so as to be used for the distance calculation at the time of retrieving. On the other hand, when the distance is not used, p is not necessarily registered.

Particularly, in the case of binary discretization (in the case of being represented by binary numbers), a threshold $T_0=0$ is used.

[Formula 5]
$$u_j = \begin{cases} 1 & \text{if } x_j \geq 0, \\ 0 & \text{otherwise,} \end{cases}$$

Based on the above formula, each of the dimensions are binarized to prepare bit vectors $u=(u_1, \ldots, u_d)$.

[Formula 6]
$$H_{index} = \left(\sum_{i=0}^{d-1} u_i 2^{i-1}\right) \bmod H_{size} \quad (2)$$

Based on the above formula, the index of the hash value is calculated, and is registered in the hash table. Here, $H_{size}$ represents the size of the hash table. Data registered in the hash table varies depending on whether or not the distance is used. When the distance is used, in addition to an image ID for a feature vector p, p per se is registered so as to be used for the distance calculation at the time of retrieving. On the other hand, when the distance is not used, p is not necessarily registered.

Figure 3:
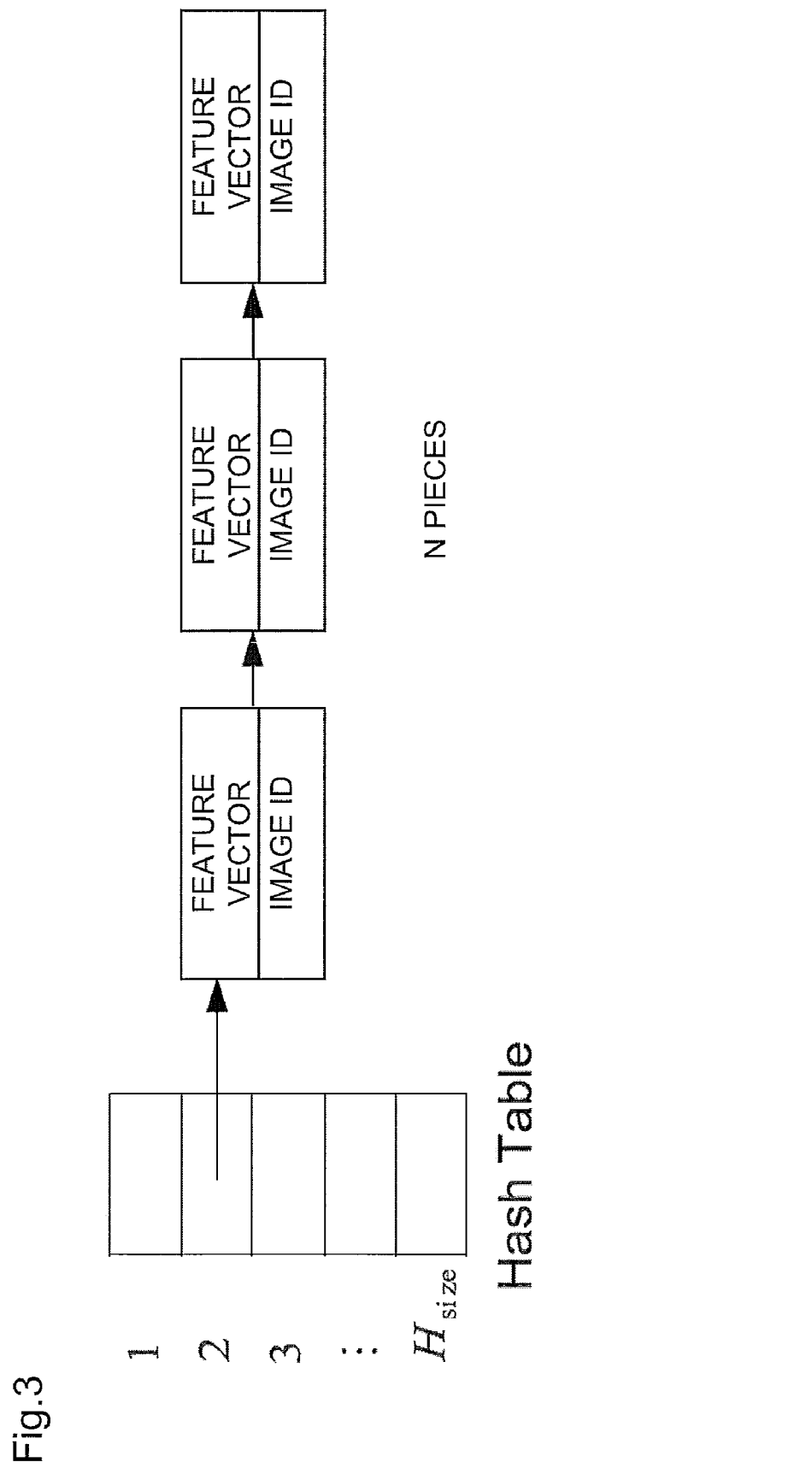
FIG. 3 is a diagram illustrating a process in data registration according to present invention, in the case where collision occurs at the time of registration in a hash table.

In the case of collisions occurring at the time of registration, a plurality of feature vectors are registered as a list by using a chaining method as shown in FIG. 3. In this case, a too long list will cause a problem of a significant increase in costs of the distance calculation. Therefore, in the present embodiment, a threshold c corresponding to a list length n is set, and when n>c is satisfied, the list is entirely deleted from the hash table. As a preliminary experiment, various weighting used for information retrieving were performed, and a result of the experiment did not present significant difference in the recognition rate. The deletion is advantageous not only for the recognition rate but also for speeding up, and thus, in the present embodiment, the deletion is applied instead of the weighting. If there are a large number of feature vectors having an identical hash value, the feature vectors do not much contribute to image recognition. Therefore, deletion of such feature vectors hardly affects the image recognition.

The above-described processing is performed with respect to all the feature vectors registered in the database, and the data registration is completed.

3. Method with Distance Calculation

Next, retrieval using the distance calculation will be described. In the present embodiment, for respective feature vectors q obtained from a query Q, feature vectors are retrieved from the above-described hash table. Suppose a set of obtained feature vectors is represented as P, and then a feature vector p* which is a nearest neighbor of q is to be obtained from P.

When a distance dist (q,p*) between the two feature vectors satisfies the following formula, a vote is given to an image ID corresponding to p*.

$$\text{dist}(q, p^*) \leq d_{max} \quad \text{[Formula 7]}$$

Wherein, $d_{max}$ is a threshold of the distance. In the case of $d_{max}=\infty$, a vote is given to p* regardless of the distance.

In the process, how to retrieve a feature vector corresponding to q is a most important step. A simplest technique is to calculate bit vectors with respect to q, in the same manner as that performed at the time of registration, and to obtain a feature vector having a common hash value by using a hash function. However, according to the process, although the number of times of distance calculation can be reduced significantly, a satisfactory recognition rate cannot be obtained. This is because values of respective dimensions of the feature vector vary depending on a photographing condition. If the variation exceeds thresholds, the bit vectors also vary, and it becomes impossible to obtain correctly corresponding feature vectors.

In the LSH, in order to solve the above-described problem, the uniform random number t is included as one of the parameter values in formula (1), whereby values close to the threshold are moved randomly. Further, according to the technique of Kobayashi disclosed in non-patent document 6, a rotation matrix is applied to the feature vectors, and a relative position of the threshold is changed.

In the present embodiment, a parameter of value error range e is used to overcome the variation. Specifically, suppose a case where parameters $q=(x_1, \ldots, x_d)$, and $T_i (i=0, 1, \ldots, z)$ which is a threshold for discretization are used.

[Formula 8]

$$[q_j - e, q_j + e) \quad (3)$$

[Formula 9]

$$(-\infty, T_0) \quad (4)$$

$$[T_i, T_{i+1}) \quad (5)$$

$$[T_z, \infty) \quad (6)$$

When a range represented by formula 8 and a range represented by formula 9 are overlapped with each other, a discrete value (0 in the case of formula (4), i+1 in the case of formula (5), and z+1 in the case of d) is allocated to each of the ranges. Here, z is a maximum value of i. Further, depending on the value of e, there is a possibility that a plurality of discrete values is to be allocated.

Figure 17:
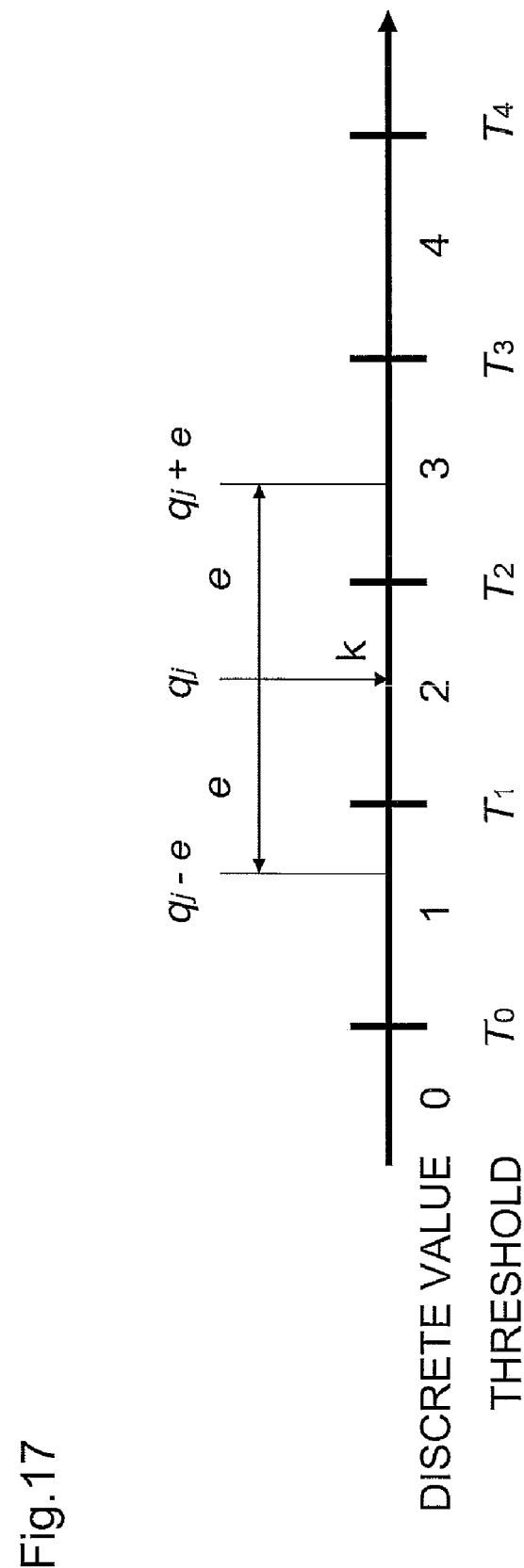
FIG. 17 is a diagram showing a method for discretization in the present embodiment, which is used to overcome variation in values of respective dimensions of a feature vector.

A case shown in FIG. 17 will be considered. In this case, there are three ranges, i.e., $[T_0,T_1]$, $[T_1,T_2]$, $[T_2,T_3]$, which are overlapped, and thus discrete values to be allocated to $q_j$ are 1, 2, 3, respectively. When a process of trying various possibilities is introduced without limitation, a vast amount of computation time is required. Therefore, in the present embodiment, the number of dimensions b to be processed is limited. When the vector is digitized into three values or more, not all the discrete values of the dimension to be processed need to be used for index calculation. For example, in FIG. 17, the discrete values used for the index calculation are selected randomly, and the process may be performed by using 1 and 2 only. Particularly, suppose a case where the value of each dimension of the feature vector is digitized into binary values.

$$|q_j| \leq e \quad \text{[Formula 10]}$$

In the case where the value of each dimension $q_j$ satisfies the above formula, in addition to $u_j$, the following formula is used to retrieve the feature vector.

$$u'_j = (u_j + 1) \bmod 2 \quad \text{[Formula 11]}$$

(1 in case of 0, 0 in case of 1)

If this strategy of "using both values" is introduced unlimitedly, a vast amount of computation time is required. In the process, when the number of dimensions to be processed is b, $2^b$ patterns of bit vectors are used to access the hash table. Therefore, in the present embodiment, the value of b is limited.

$$|q_j| \leq e \quad \text{[Formula 12]}$$

When the number of dimensions which satisfies the above formula exceeds b, b different dimensions whose indices are each equal to or less than b are applied. A dimension to be processed may be determined probabilistically. However, according to an experiment based on the notion, there was no difference in the recognition rate, and an excessive computation time was required.

The process to overcome such variation may be performed at the time of registration instead of at the time of retrieving. Specifically, $2^b$ bit vectors are generated in the same manner as those generated at the time of registration, and registered in the hash table. In this manner, it is not necessary to access the hash table using a plurality of bit vectors at the time of retrieving, and thus reduction in the processing time can be expected. However, a large number of feature vectors are registered, a memory will be under an increased load. As a result of a preliminary experiment based on this notion, there was no large difference in the processing time, whereas an increased load on the memory was presented. Thus, in the present embodiment, the process to overcome the variation is performed at the time of retrieving.

4. Method without Distance Calculation

In a method without using the distance, the above-described distance calculation is not performed with respect to the query feature vector q to obtain an approximate nearest neighbor. Instead, a voting process is performed with respect to all feature vectors belonging to a set P of feature vectors obtained from the hash table. The set P of feature vectors are expressed as follows.

$$p \in P \quad \text{[Formula 13]}$$

As with the method without using the distance, two parameters, i.e., the error range e of the features, and the number of dimensions b to overcome the variation are used.

(Cascading Depending on b)

Each of the techniques disclosed by the inventors has four parameters of b, c, d, and e. In the present embodiment, the degree of approximation is adjusted by changing the parameter b. Specifically, in the sth stage, a recognizer which satisfies b=s−1 is used. According to the techniques disclosed by the inventors, the number of indices used to access the hash table is increased in accordance with an increase of b. Therefore, not only monotonicity but also difference searchability are satisfied.

The parameter used for the cascading is not limited to b. Other parameters may be also applicable to the cascading. For example, obviously, a parameter d satisfies not only the monotonicity but also the difference searchability. Parameters c and e are also likely to satisfy both.

In the technique without distance calculation, voting is not performed while a temporary nearest neighbor $p_i^*$ is updated during the process in each of the multiple stages. Instead, voting is performed for all the feature vectors belonging to the obtained different set $P_i^{(s)} - P_i^{(s-1)}$.

(Exemplary Experiments)

In order to verify effectiveness of the techniques of the present invention, experiments were performed. First, a comparative experiment between recognizers applying to the inventor's techniques and recognizers according to the conventional techniques will be described.

<<Experiment 1>>

1. Experimental Settings 1.1. Image Database

First, images used in the experiment will be described. Three types of data sets A, B, and C which were collected by using different collection methods were prepared. FIG. 4 is a diagram illustrating exemplary registered images used in the experiment. A is one of 3,100 images collected by using Google image retrieval. Keywords used for the retrieving are "poster", "magazine", "cover sheet", and the like. FIG. 4(a) shows the example.

B is one of images available on the site of the PCA-SIFT (URL: http://www.cs.cmu.edu/~yke/pcasift), and 18,500 images are included therein. The data is mainly composed of photographs of natural scenes, human beings, and the like. FIG. 4(b) shows the example. C is composed of 78,400 images which were obtained from Flicker, which is a photograph sharing site, by using keywords such as "animal", "birthday", "food", "Japan", and the like. C includes mainly photographs of objects, natural scenes, and human beings as shown in FIG. 4(c). At the time of collection, images each having a size of 600×600 pixels or smaller were excluded. The collected images were downsized such that a longer side of an image is equal to or less than 640 pixels. Further, images each having 100 or less feature vectors were also excluded. Average lengths of one sides of respective images in A, B, and C are 498, 612, and 554 pixels, respectively.

Next, Based on the images of types A, B, and C, databases DB1 to DB5, which respectively include the numbers of images as shown in Table 1, were prepared to use in the experiment.

TABLE 1

| | The number of images included in the database | | | | |
|---|---|---|---|---|---|
| DATA SET | DB1 | DB2 | DB3 | DB4 | DB5 |
| A | 334 | 1,667 | 3,100 | 3,100 | 3,100 |
| B | 333 | 1,667 | 3,450 | 18,500 | 18,500 |
| C | 333 | 1,666 | 3,450 | 28,400 | 78,400 |
| TOTAL | 1,000 | 5,000 | 10,000 | 50,000 | 100,000 |

Here, in each type, a database having a larger number of images includes therein a database having a small number of images. From DB3, 2,069 feature vectors were extracted per image on average.

1.2. Query Image

For query, 2000 images were prepared in accordance with the following procedure. First, 100 images, 200 images, and 200 images were selected randomly from images categorized as DB1 in the data sets A, B, and C, respectively, and each of the images was printed on a sheet of A4 paper. Next, the sheet of paper was photographed with a camera. The photographed images (query images) are shown in FIG. 5. As shown in the drawing, the sheet of paper was placed such that an entirety of the sheet was photographed, and photographed while an angle θ of an optical axis of the camera with respective to the sheet was set to 90 degrees, 75 degrees, and 60 degrees. Further, a part of the sheet was photographed at an angle of 90 degrees. As a result, four images in total were obtained with respect to one sheet of paper. Further, the photographed images were each downsized to 512×341 pixels, and feature vectors were extracted by using the PCA-SIFT. An average of 605 feature vectors were obtained per image. For printing, OKI (registered trademark) C5200n (a color laser printer) was used, and for photographing, CANON (registered trademark) EOS Kiss (registered trademark) Digital (6.3 million pixels) with a lens EF-S 18-55 mm USM were used.

1.3. Evaluation

In the experiment, the ANN and the LSH were used as comparative approximate nearest neighbor searching method to be compared with the techniques according to the present invention. A program available on URL: http://www.cs.umd.edu/~mount/ANN/ was used for the ANN, and a program available on URL: http://www.mit.edu/~andoni/ was used for the LSH. A recognition rate and processing time were used as evaluation criteria. The recognition rate represents a rate of correct recognition of query images. The processing time represents time spent for retrieving per query image. The processing time does not include time necessary to extract the feature vectors. A computer used in the experiment includes AMD Opteron (registered trademark) 2.8 GHz CPU, and has a memory of 16 GB.

Through the experiment, a binary value (U=2) was used as the discrete value, and $T_0=0$ was applied to the techniques according to the present invention. In addition, a maximum threshold $d_{max}$ of the distance in the case of the technique with distance calculation was fixed to 3,000.

2. Comparative Experiment Using DB3

By using the DB3, a relation among parameters, the recognition rate, and the processing time in each of the techniques will be described.

2.1. ANN

Figure 6:
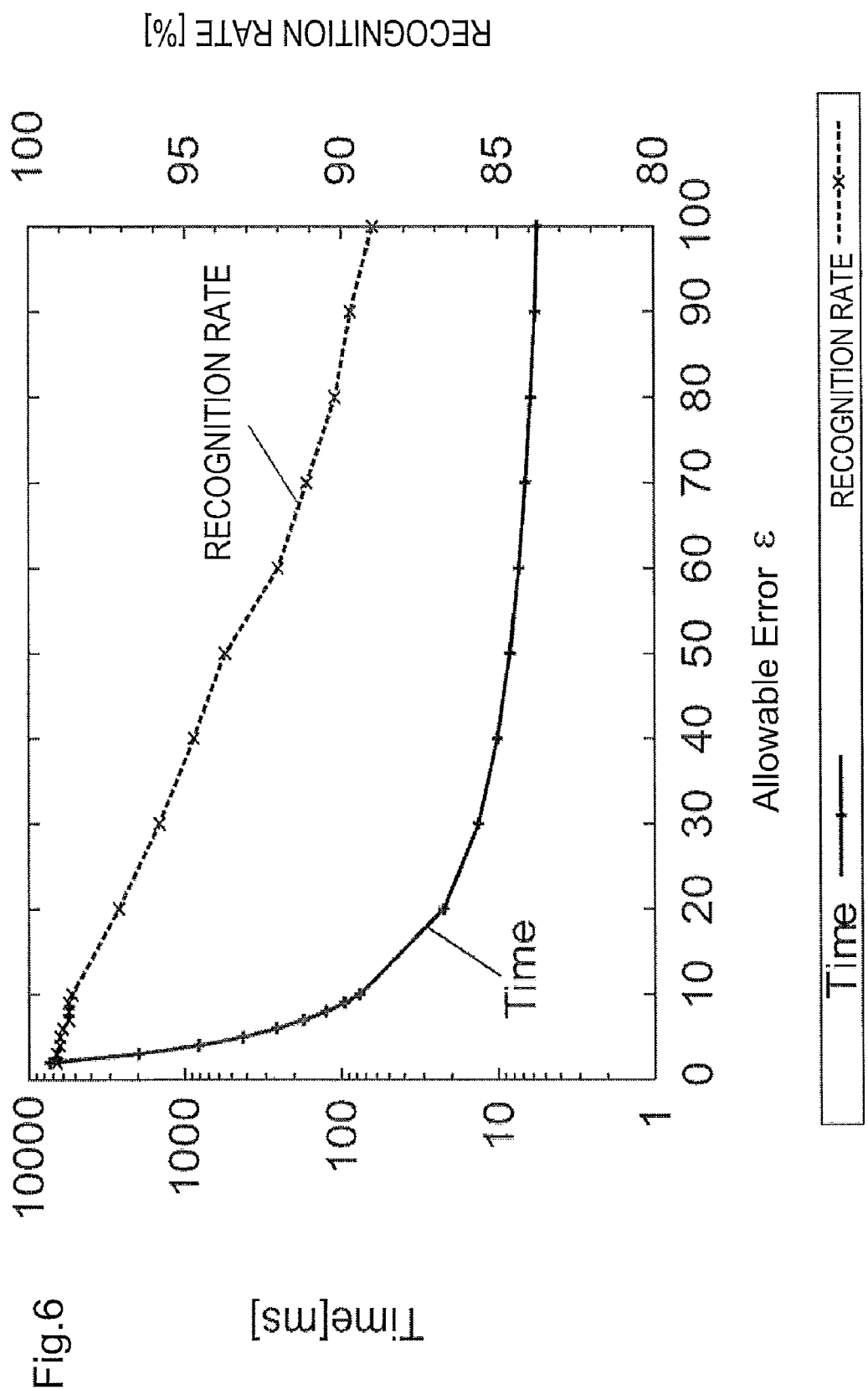
FIG. 6 is a graph showing a result of an experiment relating to a recognition rate and processing time when an allowable error is varied from 2 to 100 under a condition where the conventional ANN technique is used.

FIG. 6 shows a result of the experiment of the recognition rate and the processing time in the case where the ANN was used, in which the allowable error ε was changed between 2 and 100. It is clear that the recognition rate and the processing time are each decreased in accordance with an increase in ε. When ε is approximately in a range of 2 to 10, the decrease in the recognition rate is moderate compared to the decrease in the processing time.

2.2. LSH

Figure 7:
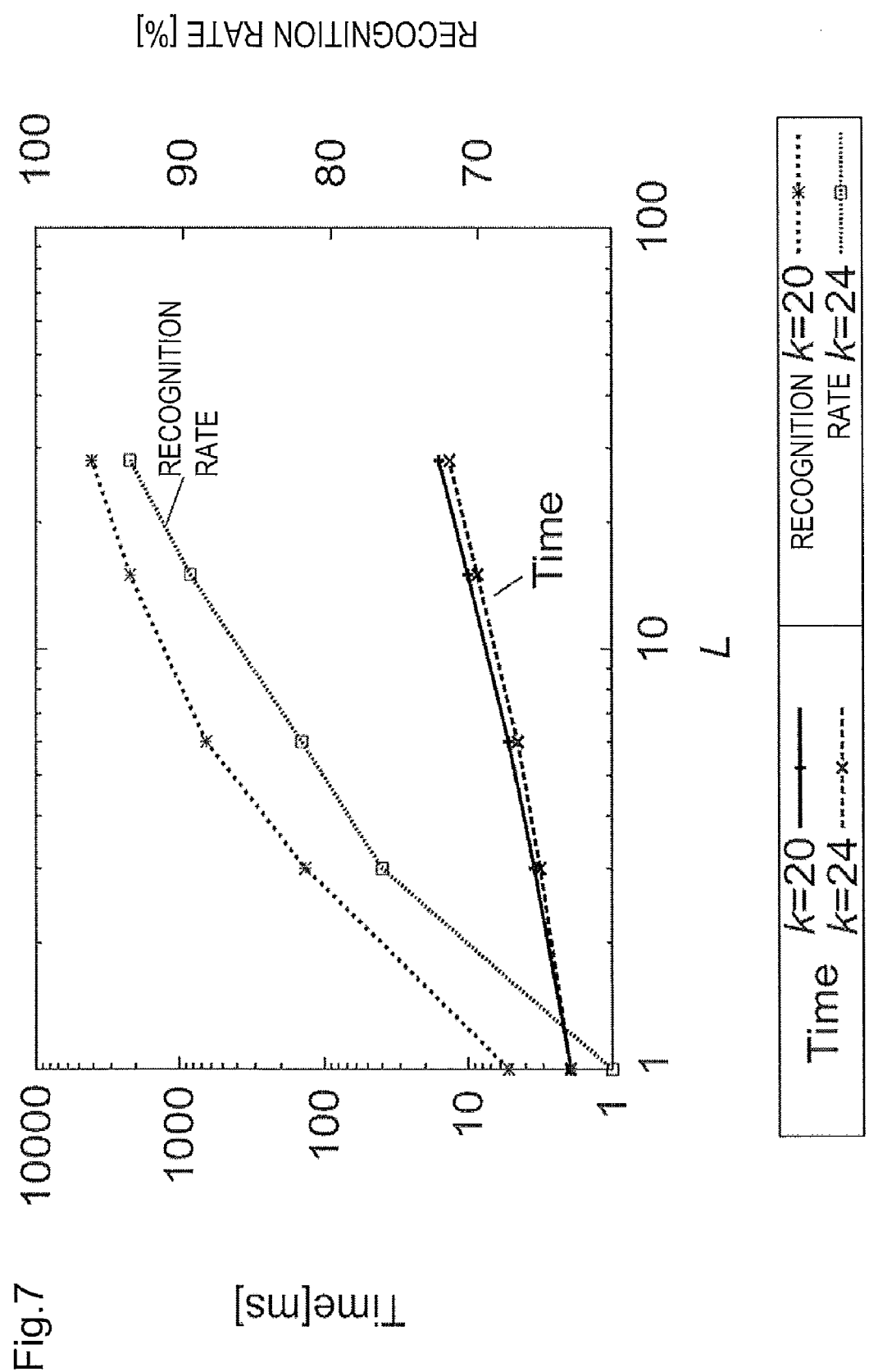
FIG. 7 is a graph showing a result of the experiment relating to the recognition rate and the processing time when the number of dimensions k of a vector after conversion and a number L of a hash function are changed under a condition where a conventional LSH technique is used.

FIG. 7 shows a result of the experiment of the recognition rate and the processing time in the case where the LSH was used, in which the number k of dimensions of a vector transformed based on the LSH, and the number L of the hash functions were changed. First, as is shown in the drawing, the recognition rate and the processing time are each increased in accordance with an increase of L. When L is increased further, the recognition rate may be improved. However, the improvement was not recognized due to insufficient memory. Further, the experiment was performed by variously changing the value of k to have a value other than those described in the drawing. As a result, when the value of k was decreased, the recognition rate was improved. However, the processing time was increased. This is because when the value of k is small, the number of feature vectors used or distance calculation increases.

2.3. Technique According to Present Invention (with Distance Calculation)

Figure 8:
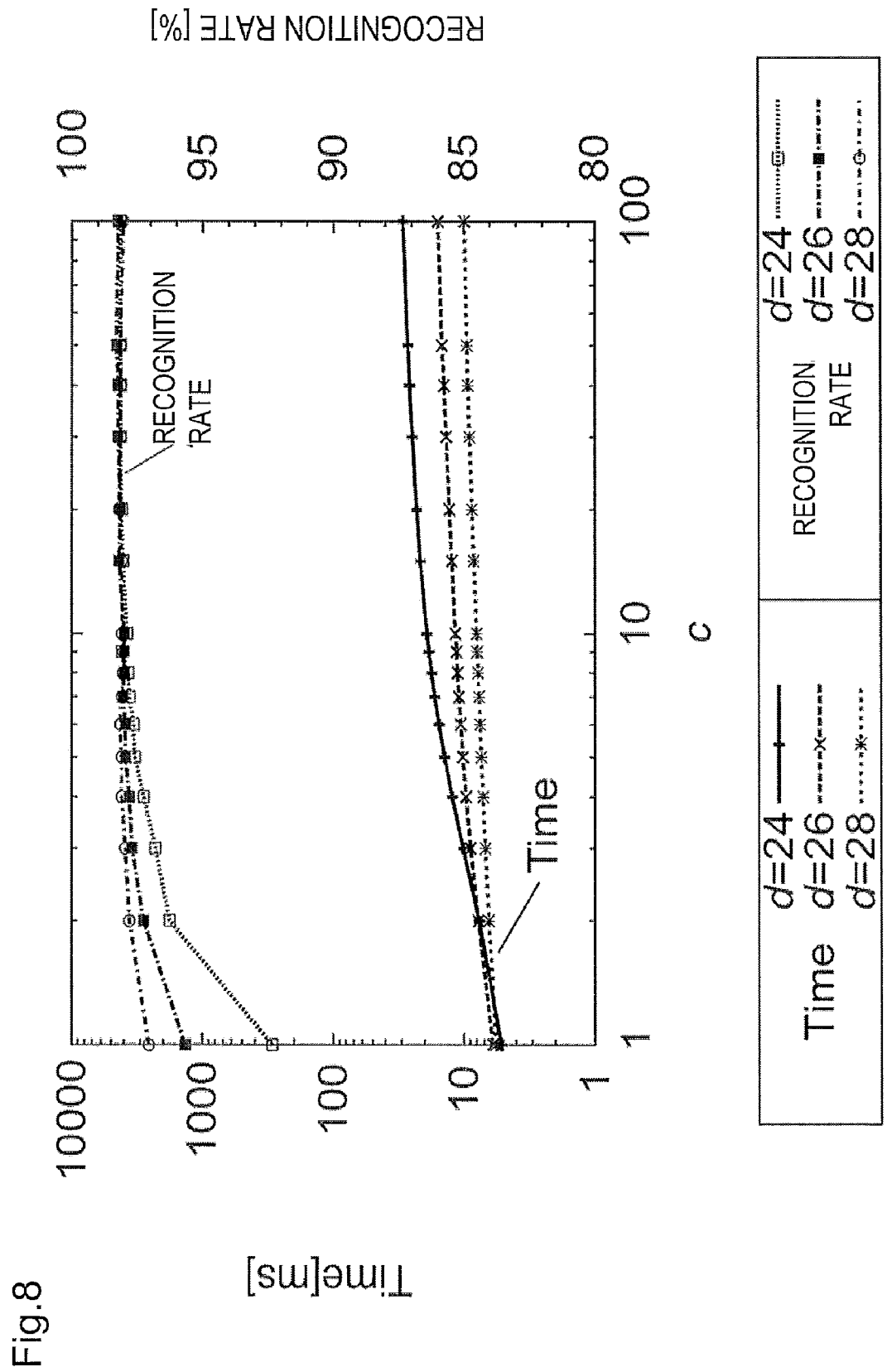
FIG. 8 is a graph showing a result of the experiment relating to the recognition rate and the processing time when a threshold c of collision is changed under a condition where a technique of the present invention with distance calculation is used.

With the technique according to the present invention with distance calculation, a relation among the threshold c of the collision, the recognition rate, and the processing time was examined. A size of the hash table was set to satisfy $H_{size}=2^d$. FIG. 8 shows a result of the experiment of the recognition rate and the processing time, in which parameters e=200, b=7, and d=24, 26, and 28 were used, and c was changed. As is clear from the drawing, the processing time is decreased in accordance with a decrease of c. However, when the value of c is too small, the recognition rate is lowered. This may be because factors that contribute to recognition were also deleted. On the other hand, when c is increased, the computation time is increased, whereas the recognition rate is hardly decreased. This is because even if a feature vector which cannot be a nearest neighbor is retrieved, such a feature vector can be excluded through the distance calculation.

Figure 9:
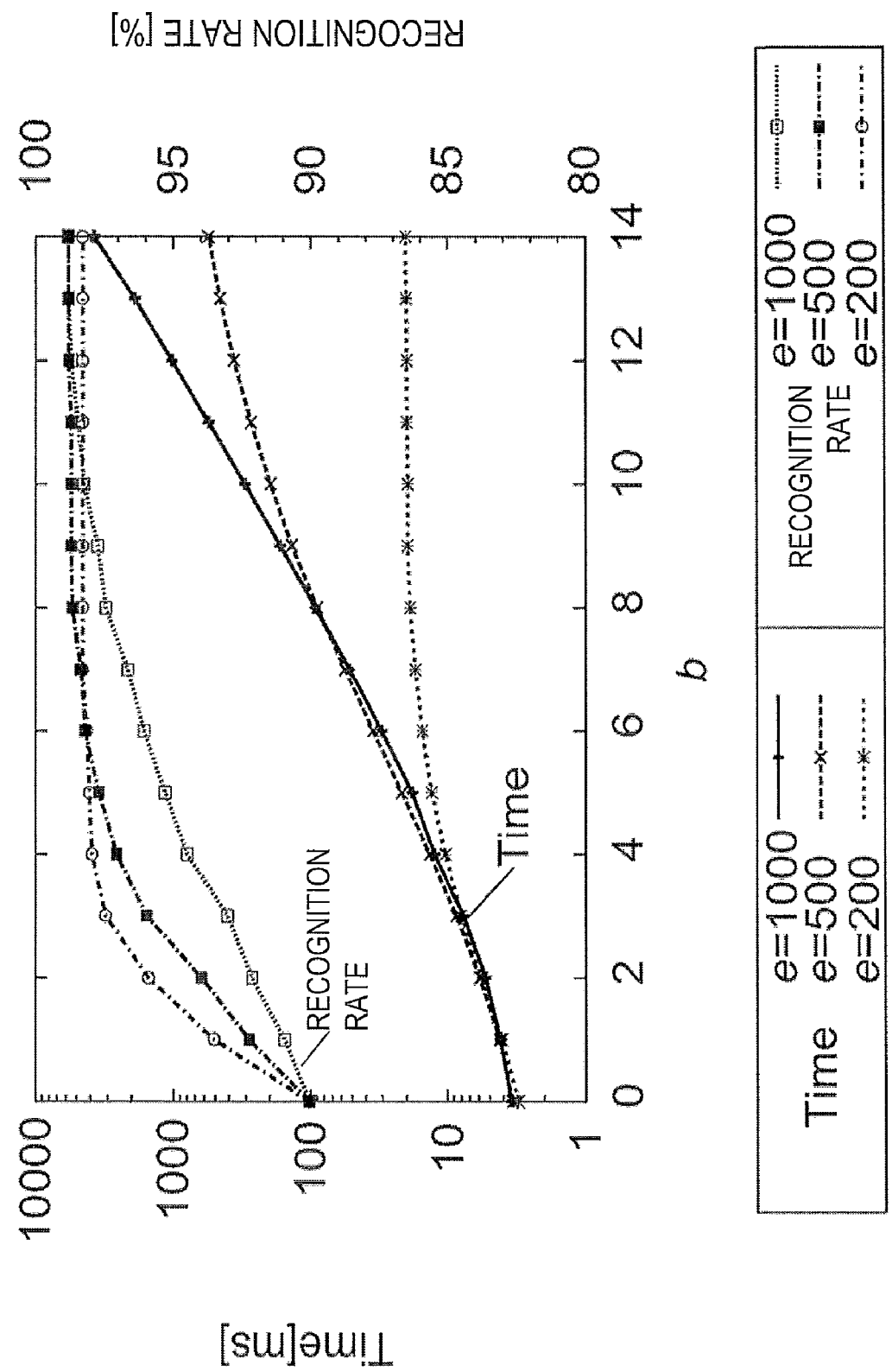
FIG. 9 is a graph showing a result of the experiment relating to the recognition rate and the processing time when the number of dimensions b to be processed is changed under a condition where the technique of the present invention with distance calculation is used.

Further, a relation among b, the recognition rate, and the processing time was examined. In order to obtain indices of hash values, the dimension to be used was set to d=26. In addition, parameters e=200, 500, and 1000, and c=∞ were used. A result of a case where b was changed is shown in FIG. 9. As shown in the drawing, when b is increased, the processing time is increased, and the recognition rate is improved. When the value of b is relatively small, the recognition rate is high in the case of e=200.

2.4 Technique According to Present Invention (without Distance Calculation)

Figure 10:
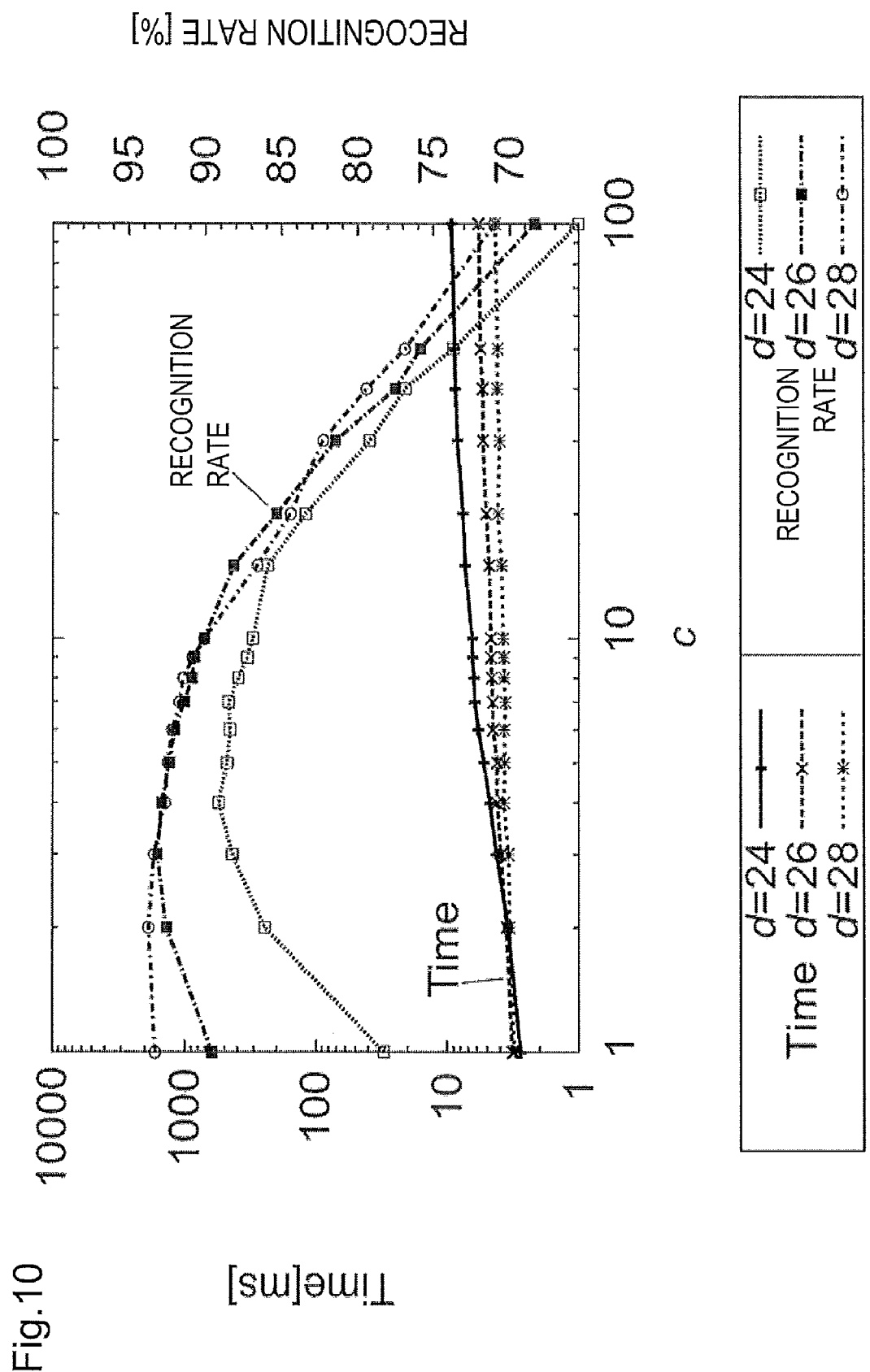
FIG. 10 is a graph showing a result of the experiment relating to the recognition rate and the processing time when the threshold c of collision is changed under a condition where a technique of the present invention without distance calculation is used.

Next, with the technique according to the present invention without distance calculation, the relation among c, the recognition rate, and the processing time was examined. FIG. 10 shows a result of a case where c was changed while parameters d=24, 26, and 28, e=200, and b=5 were used. As shown in the drawing, with respect to the case of d=24, 26, and 28, the recognition rate reaches its maximum value in the case where c takes as small values as to satisfy c=2, 3, and 4, respectively. This may be because, in the technique without distance calculation, voting was performed with respect those many feature vectors which cannot be the nearest neighbor. The result makes a good contrast with the result shown in FIG. 8 in which the distance calculation was applied.

Figure 11:
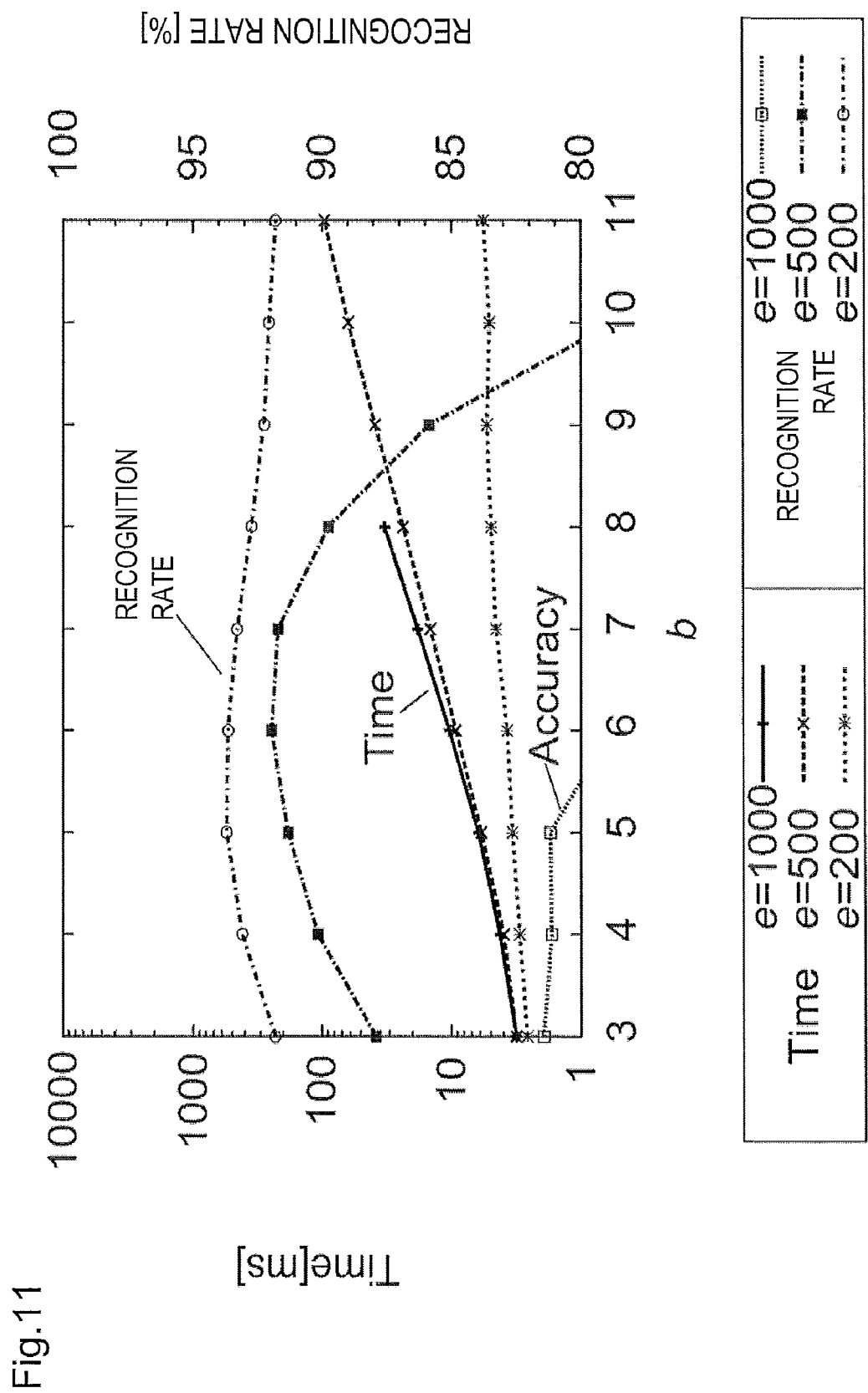
FIG. 11 is a graph showing a result of the experiment relating to the recognition rate and the processing time when the number c of dimensions to be processed is changed under a condition where the technique of the present invention without distance calculation is used.

Further, the relation among b, the recognition rate, and the processing time was examined. FIG. 11 shows a result of a case where b was changed while parameters d=28, e=200, and c=2 were used. In accordance with the increase of b until b=5 was satisfied, the recognition rate was improved. When b was increased more than the value, the recognition rate was lowered. This is probably because due to the increase of b, voting for inappropriate feature vectors which cannot be the nearest neighbor was increased. The result makes a good contrast with the result of the case with distance calculation, in which, as shown in FIG. 9, the recognition rate is not decreased in accordance with the increase of b.

2.5. Comparison Among Techniques

Figure 12:
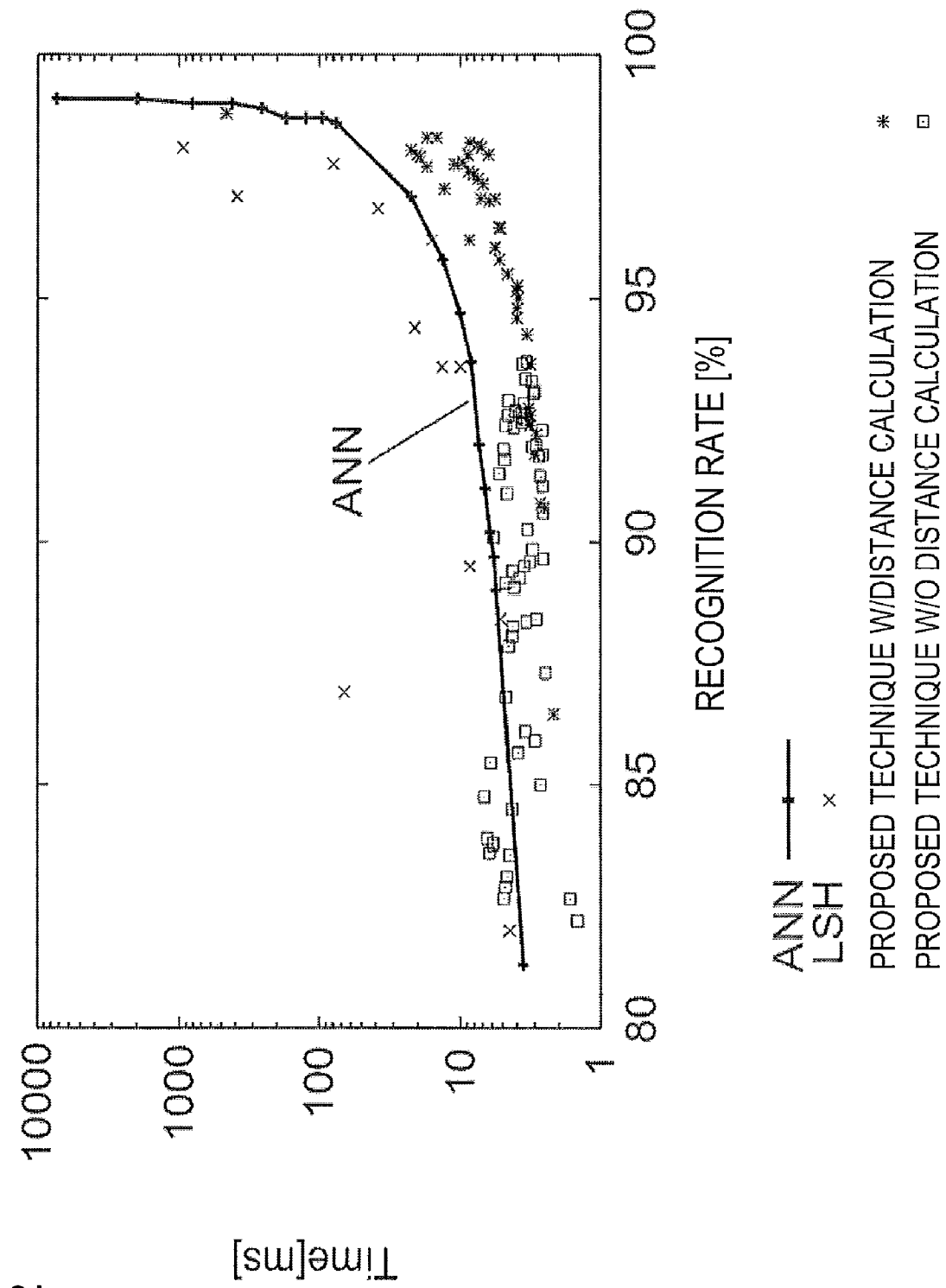
FIG. 12 is a graph in which recognition rate is represented along a horizontal axis and the processing time is represented along a vertical axis so as to show comparison between features of the techniques according to the present invention and those of conventional art.

FIG. 12 shows a graph having the horizontal axis representing the recognition rate and the vertical axis representing the processing time, and also shows the results of the experiment in which the parameters were changed variously to compare characteristics of the respective techniques. Results of the experiment based on the ANN, in which the parameters were changed, are connected and represented with a curved line, which is used as an evaluation criterion. Such a point that is plotted on the righter side indicates a higher recognition rate, whereas such a point that is plotted on the lower side indicates a shorter processing time. Therefore, a point that is plotted on the bottom right side indicates an excellent result. Most of the results obtained by the LSH do not exceed the line of the ANN. Regarding the technique with distance calculation according to the present invention, in the case where the recognition rate is equal to or lower than 98%, results obtained by the technique is superior to those obtained by the ANN. Results of the technique without distance calculation according to the present invention is superior to those based on the ANN in most cases.

Figure 13:
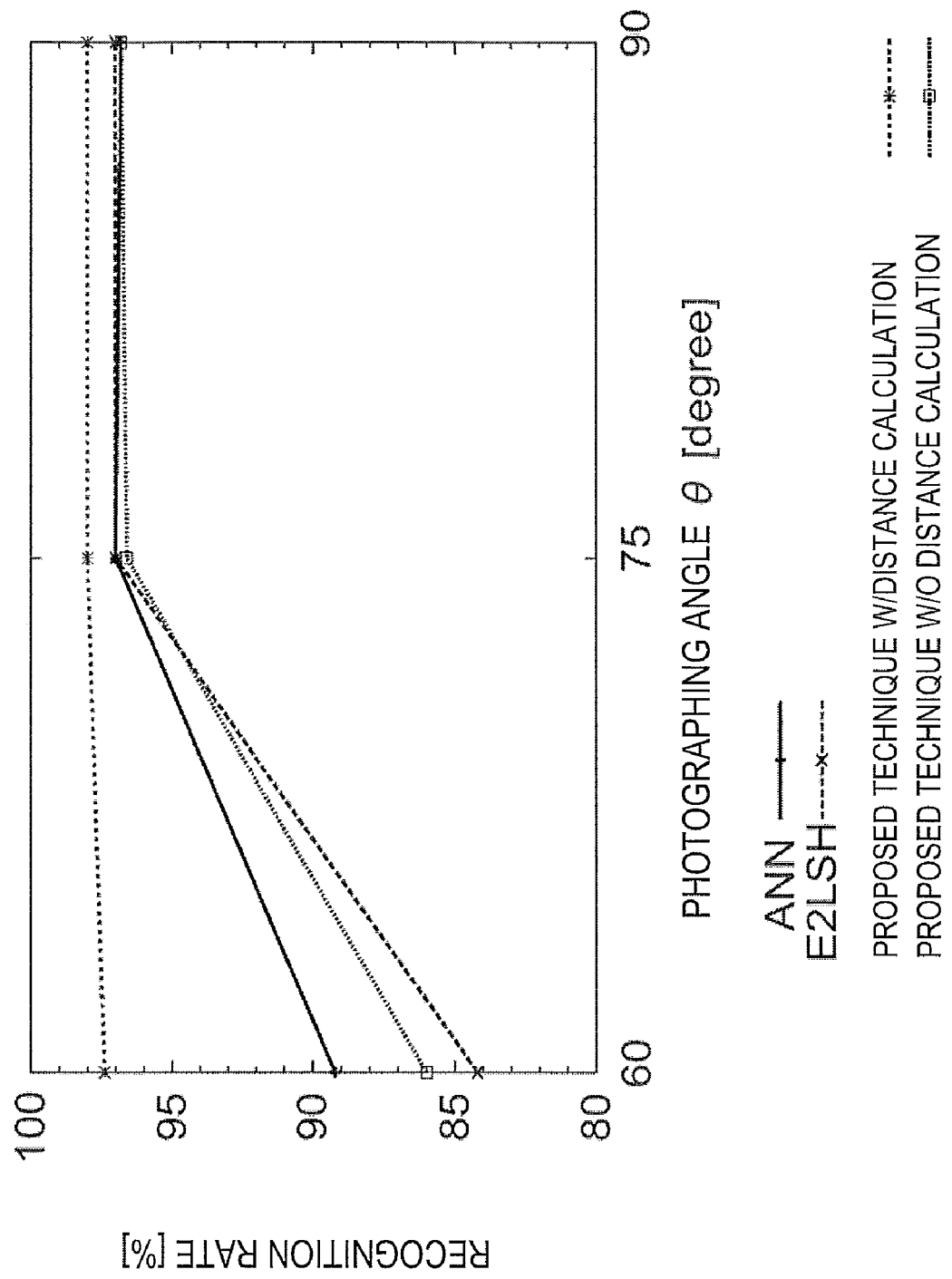
FIG. 13 is a graph showing a relation between a photographing angle and the recognition rate in each of the techniques according to the present invention and the conventional techniques.

Next, a relation between a photographing angle and the recognition rate in each of the techniques was examined. FIG. 13 shows results of cases each having the processing time of about 10 ms and most preferable recognition rate. Parameters used were e=40 for ANN, k=20, and L=15 for LSH, e=200, b=4, c=8, and d=24 for the technique with distance calculation, and e=200, b=5, c=2, and d=28 for technique without distance calculation. Note that in the case of the technique without distance calculation, the processing time of 3.4 ms was applied. As is clear from the drawing, under the same processing time, the technique with distance calculation obtained a higher recognition rate compared to the ANN and the LSH. In addition, the technique without distance calculation achieved almost the same recognition rate as the ANN only with the processing time ⅓ of that of the ANN, except for the case of θ=60 degrees.

The relation between the recognition rate and the processing time when the respective parameters of typical values, respectively, were used is shown in Table 2.

As is clear from the drawing, the technique with distance calculation achieved almost the same recognition rate as the ANN with the processing time ⅓ of that of the ANN. On the other hand, an average recognition rate of the technique without distance calculation is lower than that of the ANN. This is because the recognition rate is low when θ=60 degrees. In a limited case of θ≧75 degrees, the technique can achieve the recognition rate of about 96%, with the processing time as short as 4 ms or lower.

3. Experiment Using DB1-DB5

Figure 14:
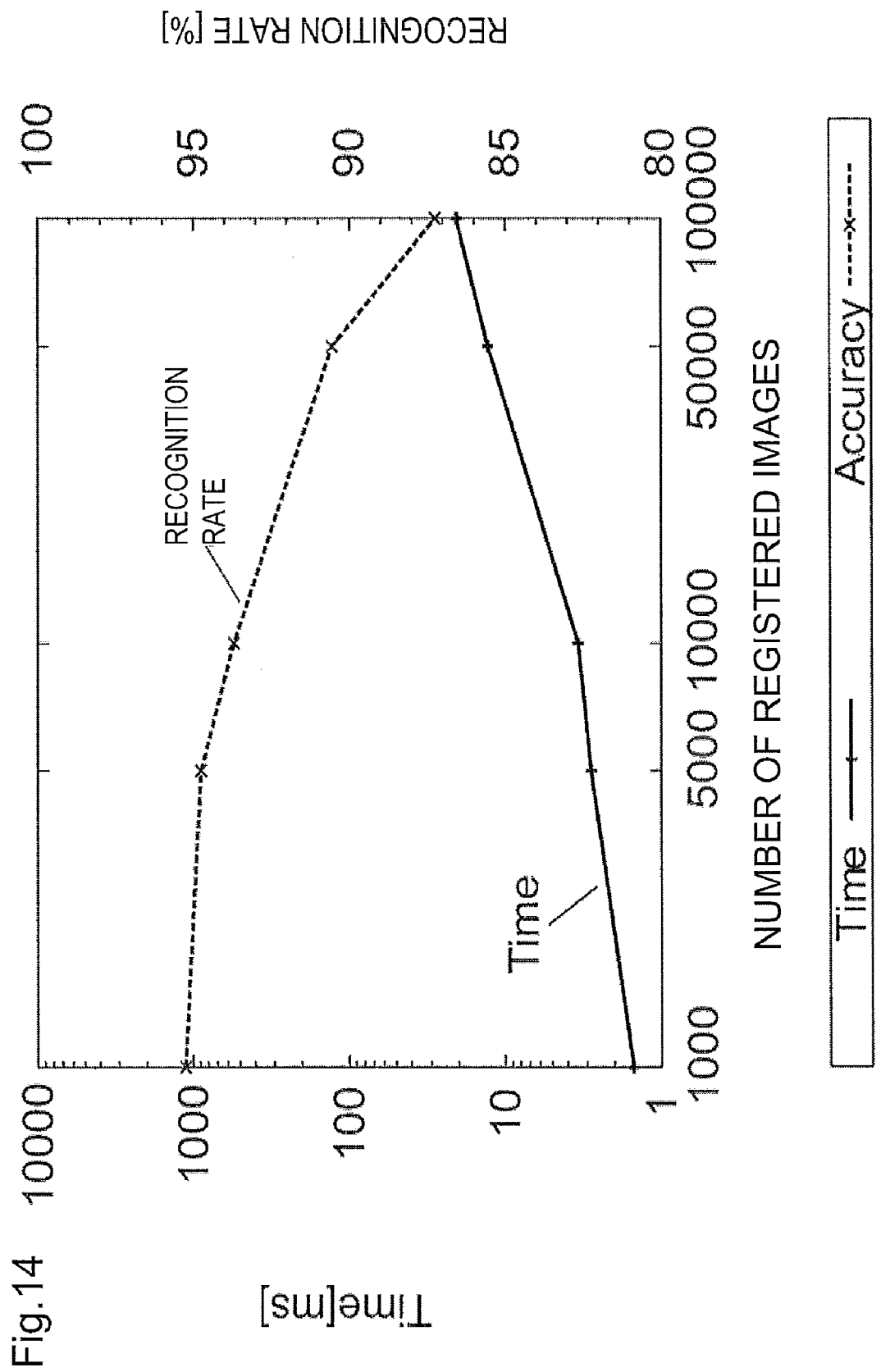
FIG. 14 is a graph showing a relation among the number of registered images, the recognition rate, and the processing time in the case where the technique of the present invention without distance calculation is used.

All the techniques except for the technique without distance calculation need to retain data of original feature vectors for retrieval, and thus were not able to perform retrieval from data in DB4 and DB5 due to insufficient memory. On the other hand, the technique without distance calculation only needs to register image IDs in the hash table, which places less load on the memory, and thus was able to perform retrieval from a database including up to 100,000 images. Accordingly, the relation among the number of the registered images, the recognition rate, and the processing time was examined under a condition where parameters e=200, and d=28 were used, and b and c were changed. FIG. 14 shows most favorable recognition rates. Parameters used in that case were b=5, 6, 5, 6, and 5, and c=1, 1, 2, 4, and 5 with respect to DB1 to DB5, respectively. Even when the number of the registered images are increased to 100,000, the recognition rate of 87.3%, and the processing time of 20.6 ms were yielded. When the case of θ=60 degrees is excluded, the recognition rate is increased to 91.4%.

In this manner, the technique without distance calculation is not satisfactory compared to the other techniques in terms of the recognition rate. However, the technique excels in scalability provided that the recognition rate of a certain level is regarded as satisfactory. Further, the technique simply performs processing of accessing the hash table and voting, which is regarded as advantageous.

Next, single-stage recognizers are configured by applying the technique with distance calculation as well as the ANN and the LSH, i.e., the conventional approximate nearest neighbor search techniques, in order to be compared with the cascaded recognizers based on the techniques disclosed by the inventors.

<<Experiment 2>>

1. Experiment Settings

The local descriptors were obtained from images available on the site of PCA-SIFT. The size of the hash table was $H_{size}=2^d$. The processing time described below represents time spent for recognition per query image. Time necessary to extract feature vectors is not included therein. A computer used has the same configuration as that used in experiment 1. In the experiment, the cascaded recognizers as shown in FIG. 23 were used.

TABLE 2

Recognition rate [%] and processing time [ms] obtained by respective techniques

| TECHNIQUE | PARAMETERS | 60° ACC. | 60° TIME | 75° ACC. | 75° TIME | 90° ACC. | 90° TIME | PART ACC. | PART TIME | AVE. ACC. | AVE. TIME |
|---|---|---|---|---|---|---|---|---|---|---|---|
| ANN | e = 3 | 98.6 | 1261.2 | 99.0 | 1304.9 | 99.2 | 1294.9 | 99.6 | 4020.0 | 99.1 | 1970.2 |
|  | e = 10 | 98.2 | 48.4 | 98.6 | 53.0 | 98.4 | 52.8 | 99.0 | 151.0 | 98.6 | 76.3 |
|  | e = 20 | 94.6 | 13.9 | 98.2 | 16.0 | 98.0 | 16.0 | 97.4 | 43.7 | 97.1 | 22.4 |
| LSH | k = 20, L = 28 | 91.4 | 9.5 | 98.0 | 11.7 | 97.6 | 12.0 | 97.8 | 30.8 | 96.2 | 16.0 |
|  | k = 20, L = 15 | 84.2 | 6.0 | 97.0 | 7.2 | 97.0 | 7.4 | 96.2 | 19.5 | 93.6 | 10.0 |
| PROPOSED TECHNIQUE W/DIS. CAL. | b = 9, e = 200, d = 26 | 97.8 | 12.1 | 98.6 | 15.0 | 98.4 | 14.8 | 98.4 | 36.7 | 98.3 | 19.6 |
|  | b = 4, e = 200, c = 50, d = 26 | 97.2 | 5.7 | 98.4 | 6.5 | 98.4 | 6.6 | 98.0 | 14.2 | 98.0 | 8.3 |
| PROPOSED TECHNIQUE W/O DIS. CAL. | b = 5, e = 200, c = 2, d = 28 | 86.0 | 2.5 | 96.6 | 2.9 | 96.8 | 2.7 | 95.4 | 5.4 | 93.7 | 3.4 |
|  | b = 0, c = 11, d = 24 | 57.6 | 1.4 | 89.6 | 1.5 | 91.8 | 1.5 | 91.6 | 2.2 | 82.7 | 1.6 |

1.1. Image Database

Images in an image database were collected from the same sources as experiment 1, and the number of images collected by using Google image retrieval was 3,100, that from images available on the site of PCA-SIFT was 3,450, and that from Flicker, i.e., the photograph sharing site, by using keywords of "animal", "birthday", "food" and the like was 3,450. 10,000 images in total were collected.

1.2. Query Image

Two types of retrieval queries, i.e., one whose corresponding image is included in the database, and the other whose corresponding image is not included in the database, were arranged. With respect to the former query, 100 images, 200 images, 200 images, i.e., 500 images in total, were randomly selected from the images, in the database, collected based on the respective collection methods. In the latter query, 199 images which were not included in the image database were arranged. Next, each of the images was printed on a sheet of A4 paper, and was photographed with a camera. As with experiment 1, each image was placed such that the entirety of the sheet was photographed, and photographed while an angle $\theta$ of an optical axis of the camera with respect to the sheet was set to 90 degrees, 75 degrees, and 60 degrees. Further, a part of the sheet was photographed at an angle of 90 degrees. As a result, four images in total were obtained with respect to one sheet of paper. Further, the photographed images were each downsized to 512×341 pixels, and feature vectors are obtained by using the PCA-SIFT. An average of 605 feature vectors were obtained per image.

2. Case of No Rejection

First, the experiment was performed by using only queries whose corresponding images are included in the database.

2.1. Relation between Accuracy of Approximate Nearest Neighbor Searching and Recognition Rate of Image First, as a preliminary experiment, accuracy of the nearest neighbor searching necessary to recognize an image was examined. Specifically, with respect to each of the techniques (based on the ANN, the LSH, and with distance calculation) without cascading, parameters were changed variously, and the relation between the accuracy of the approximate nearest neighbor searching and the recognition rate of an image was examined. The accuracy of the approximate nearest neighbor searching represents a rate of exact nearest neighbors obtained by using the approximate nearest neighbor searching.

Figure 19:
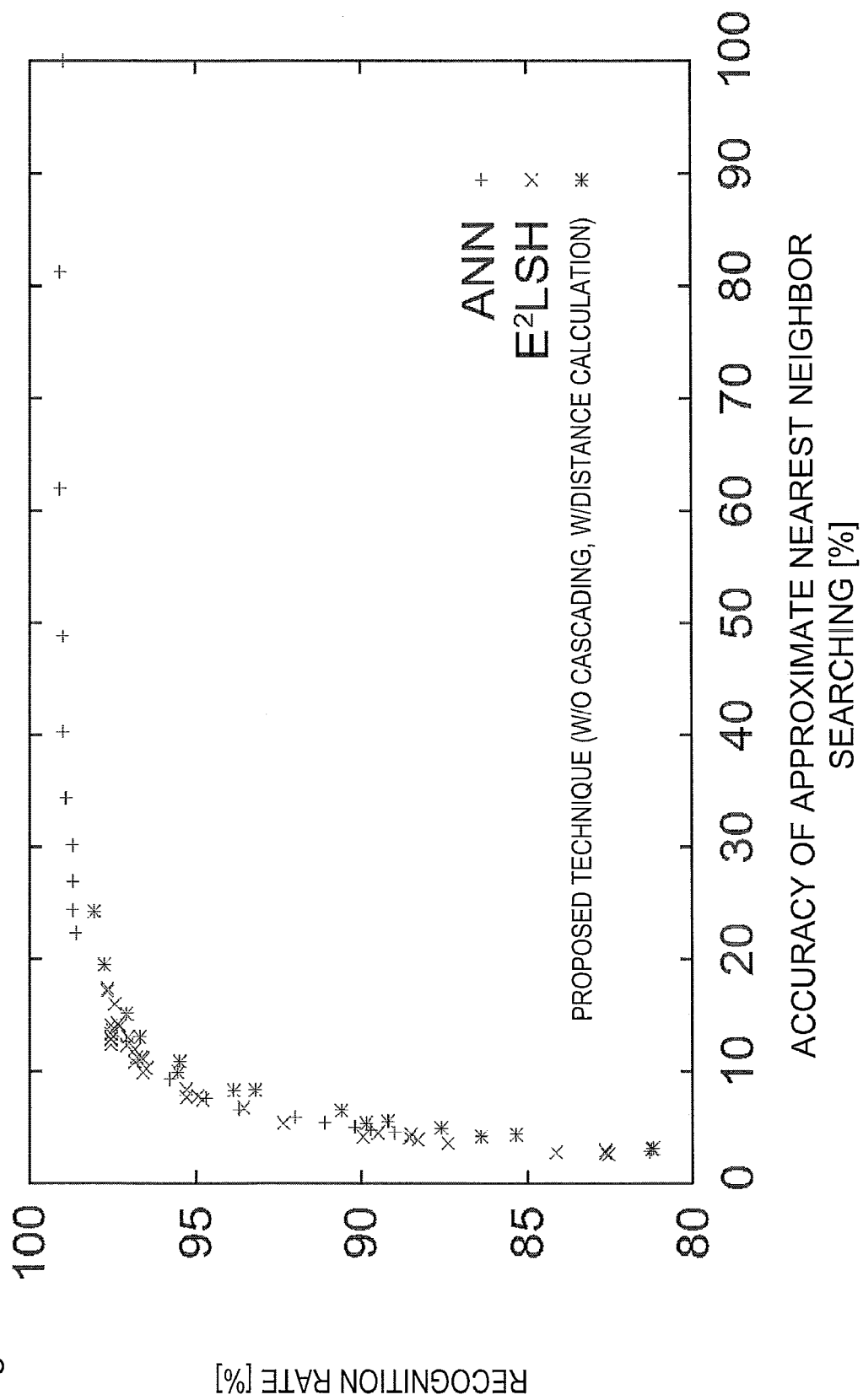
FIG. 19 is a graph showing a relation between accuracy of approximate nearest neighbor searching and an image recognition rate in the case where a conventional technique is used.

FIG. 19 shows a result of the experiment. According to the result, when the accuracy of the approximate nearest neighbor searching ranges approximately between 100% and 20%, the recognition rate hardly decreases, even if the accuracy of the approximate nearest neighbor searching decreases. Presumably, this is because even if votes are erroneously given to other images, the number of votes for a correct image is not exceeded by that for other images. Further, the relation between the accuracy of the approximate nearest neighbor searching and the recognition rate may be partly independent of the techniques.

2.2. Reduction in Processing Based on Cascading.

Figure 20:
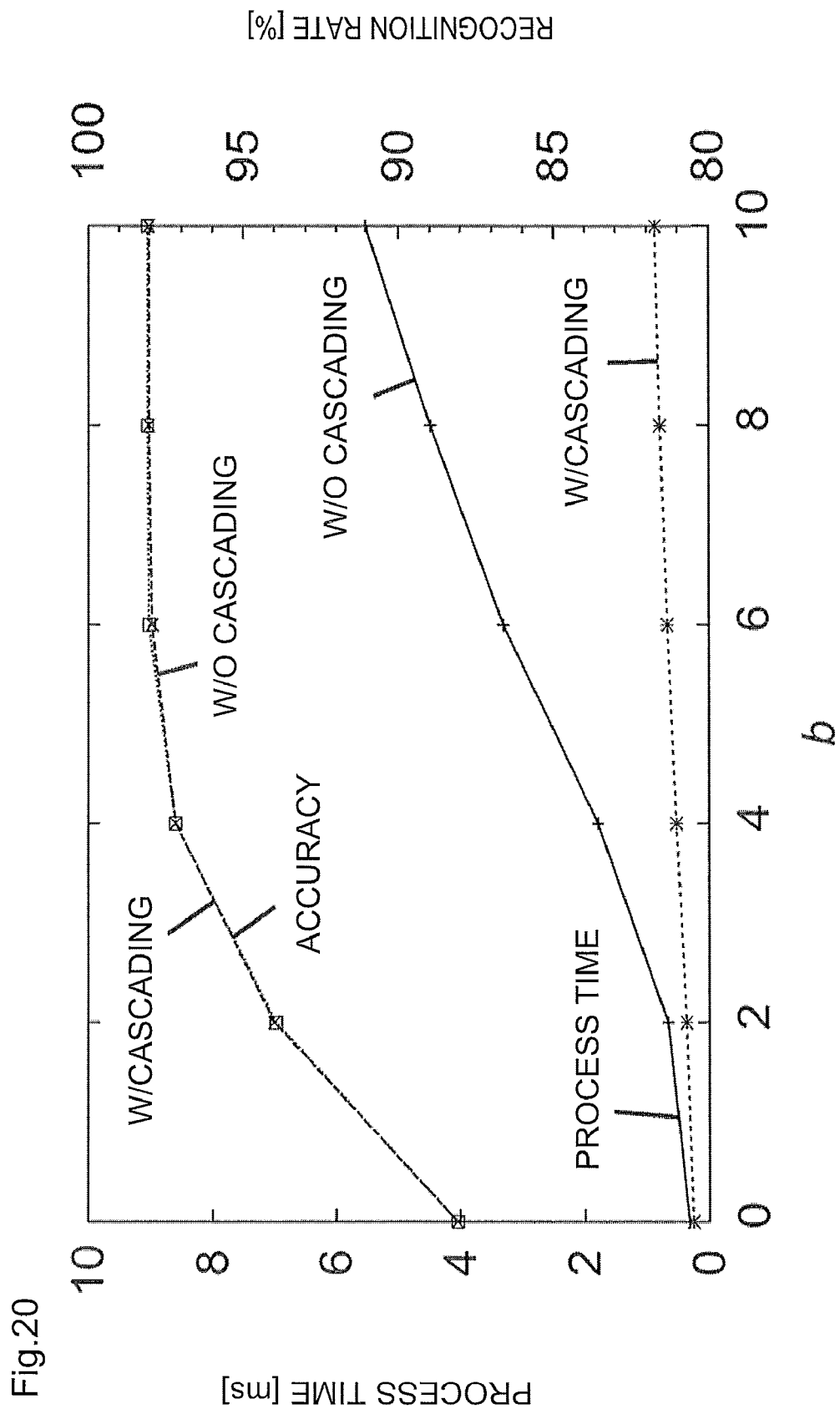
FIG. 20 is a graph showing a relation among b, the recognition rate, and the processing time in the technique of the present invention with distance calculation.

Next, an effect of the cascading will be verified. The technique with distance calculation was used to examine the relation among b, the recognition rate, and the processing time. FIG. 20 shows a result of the experiment in which parameters e=200, c=5, d=28, t=2, and r=0.5 were applied, and b was changed. In the case where the cascading was used, the recognition rate was hardly lowered, and the processing time was reduced, compared to the case where the cascading was not applied. As is clear from the drawing, as the number of the stages (N=b+1) of the cascading increases, the processing time is reduced effectively.

Figure 21:
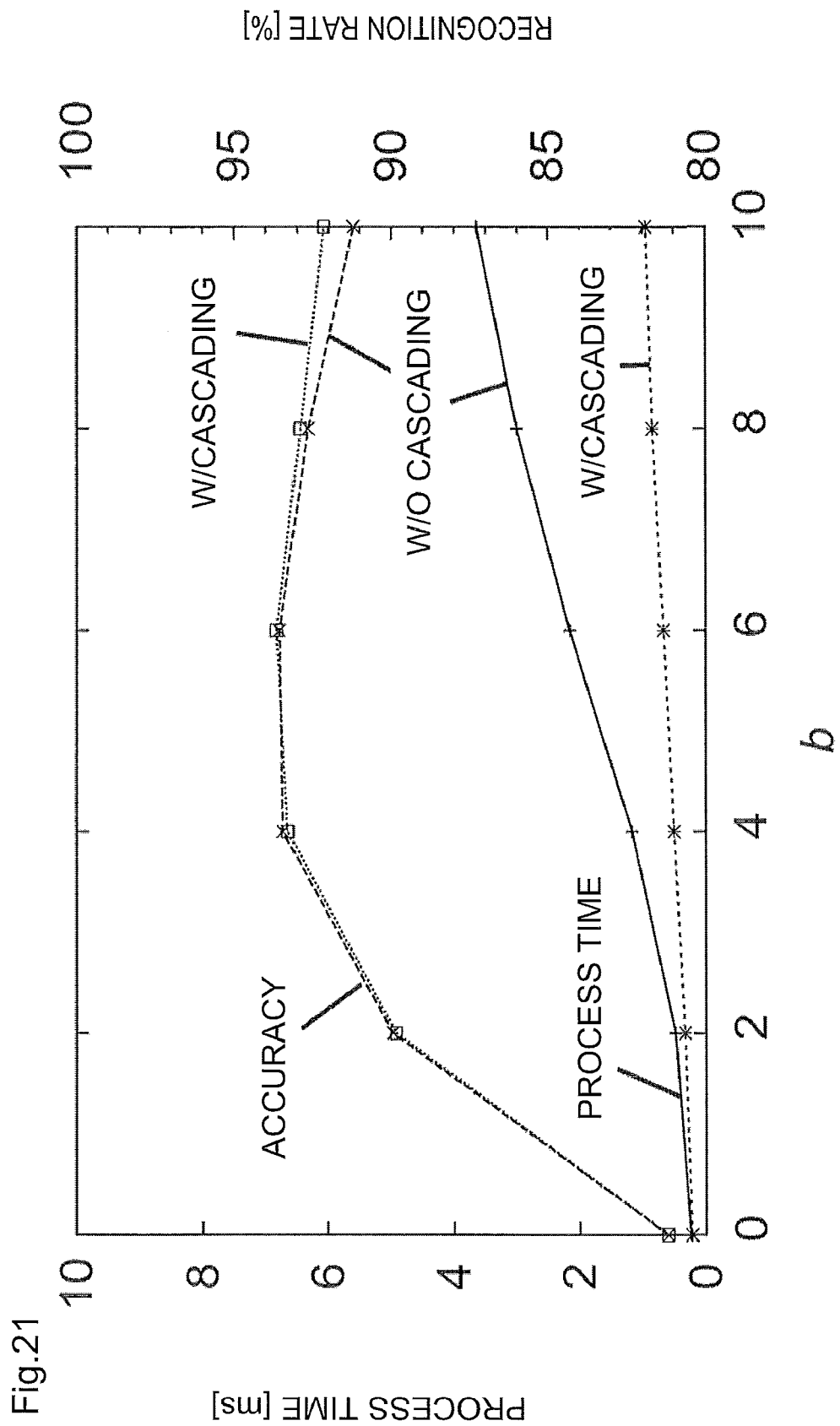
FIG. 21 is a graph showing a relation among b, the recognition rate, and the processing time in the case where the technique of the present invention without distance calculation is used.

In a similar manner, the technique without distance calculation was used to examine the relation among b, the recognition rate, and the processing time. FIG. 21 shows a result of the experiment in which parameters e=200, c=3, d=28, t=2, and r=0.5 were used, and b was changed. The result shows that it is possible to reduce the processing time even with the use of the technique without distance calculation.

2.3. Comparison Among Respective Techniques

Figure 22:
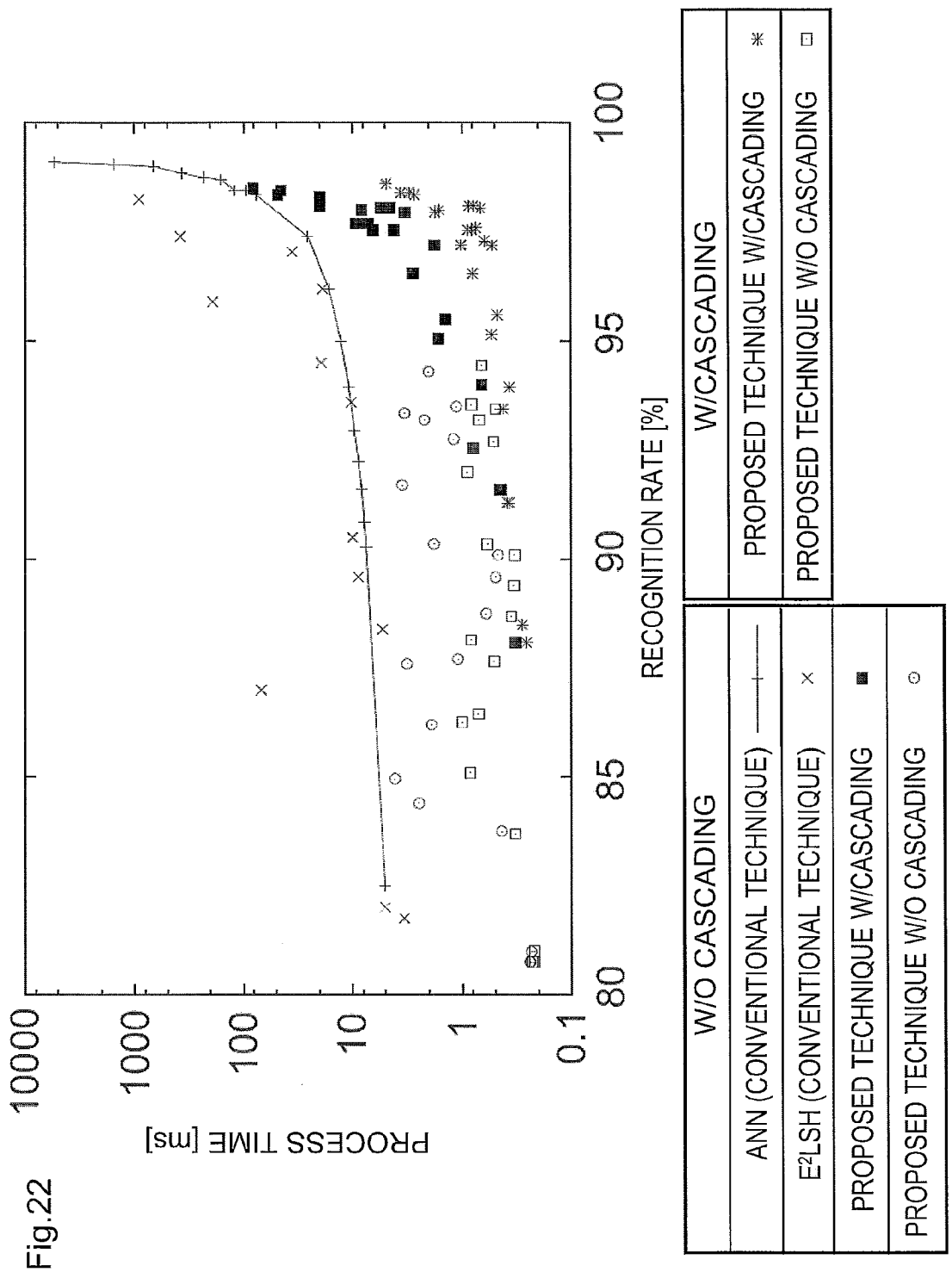
FIG. 22 is a graph showing a relation between the recognition rate and the processing time which is obtained from each of the techniques according to the present invention and the conventional technique, and also showing a comparison among characteristics of the techniques according to the present invention and of the conventional techniques under a condition where rejection is not performed.

FIG. 22 is a graph shows the relation between the recognition rate and the processing time in the case where parameters were changed variously in each of the techniques, and shows comparison among characteristics of the techniques. Results of the experiment based on the ANN in which the allowable error $\epsilon$ was changed are connected and represented with a curved line, which is used as an evaluation criterion. Such a point that is plotted on the righter side indicates a higher recognition rate, whereas such a point that is plotted on the lower side indicates a shorter processing time. Therefore, a point that is plotted on the bottom right side indicates an excellent result. Most of the results obtained based on the LSH do not exceed the line of the ANN. Regarding the technique with distance calculation, a maximum recognition rate thereof does not exceed that of the ANN, however, when the recognition rate is 98% or lower, the same level of recognition rate was achieved with processing time approximately 1/10 to 1/40 of that of the ANN. When the cascading is applied to the proposed technique, the processing time is reduced approximately to 1/5 of that of the technique with distance calculation.

3. In Case of Rejection

Next, a result of an experiment in the case where rejection is performed will be described. Evaluation measures are defined as follows. With respect to a query whose corresponding image is included in the database, parameters of a recognition rate $C_1$, a recognition error rate $E_1$, and a reject rate $R_1$ were used so as to satisfy $C_1+E_1+R_1=1$. With respect to a query whose corresponding image is not included in the database, parameters of the recognition error rate $E_2$ and the reject rate $R_2$ were used so as to satisfy $E_2+R_2=1$.

First, an experiment was performed based on a 10-fold cross validation by using the technique proposed by the present invention with distance calculation. With respect to a training sample, parameters to lead to a minimum value of

TABLE 3

Table Result of a case where rejection is performed

| PARAMETER DETERMINATION CRITERIA | | TECHQNIQUE | QUERY W/CORRESPONDING IMAGE | | | | QUERY W/O CORRESPONDING IMAGE | | |
|---|---|---|---|---|---|---|---|---|---|
| | | | $C_1$ [%] | $E_1$ [%] | $R_1$ [%] | PROCESS TIME [ms] | $E_2$ [%] | $R_2$ [%] | PROCESS TIME [ms] |
| CRITERIA A | $E_1=0, E_2=0$ min $R_1$ | W/DIS. CAL. | 87.85 | 0.00 | 12.15 | 3.0 | 0.25 | 99.75 | 12.6 |
| | | W/O DIS. CAL. | 68.25 | 0.00 | 31.75 | 1.5 | 0.26 | 99.74 | 6.0 |
| CRITERIA B | min($E_1+E_2+R_1$) | W/DIS. CAL. | 95.50 | 0.05 | 4.45 | 6.6 | 0.62 | 99.38 | 61.8 |
| | | W/O DIS. CAL. | 86.30 | 0.05 | 13.65 | 1.0 | 2.26 | 97.74 | 6.0 | parameter $R_1$, under a condition where $E_1=0$ and $E_2=0$ are satisfied, were calculated. The obtained parameters were applied to a test sample (Criteria A). In addition, with respect to a training sample, parameters to lead to a minimum value of $E_1+E_2+R_1$ were calculated, and applied to a test sample (Criteria B). All combinations of parameters b=5 and 10, d=24 and 28, e=200 and 400, c=5, t=4, 8, and 12, and r=0.2, 0.4, and 0.6 were used. In the case of the proposed technique without distance calculation, c=2 was added to the parameters, and a similar experiment was performed.

A result of the experiment is shown in Table 3. In the case where the parameters were set based on Criteria A, the proposed technique with distance calculation was able to achieve recognition error rate $E_2$ of 0% when the reject rate $R_1$ was 12.15%. In this case, recognition error rate $E_2$ was not 0%, but still as low as 0.25%. When the parameters were set based on Criteria B, the recognition error rate was slightly increased, however, the reject rate $R_1$ was reduced to ⅓. On the other hand, results obtained from the proposed technique without distance calculation were inferior to those obtained from the proposed technique with distance calculation.

Regarding the processing time, the processing time taken with respect to a query whose corresponding image does not exist was approximately 4 to 9 times longer. This is because, due to the cascading, most of the queries whose corresponding images do not exist are processed until the last stage, and then rejected, whereas queries whose corresponding images exist obtain respective answers before processing proceeds to the last stage.

In addition to the above-described embodiments, there are various modifications applicable to the present invention. For example, the present invention may be applicable to those objects other than planar objects.

In the scope of the present invention, the scope of claims, their equivalents, and any modifications thereof within the scope of the claims should be included.

Industrial Applicability

An object recognition process according to the present invention is capable of recognizing an object in an image captured with a camera, and is applicable to a service which performs information processing based on the recognition result. As a specific example of the information processing, there is processing of indexing an existing image, a video image, and the like.

The invention claimed is:

1. An image recognition method for identifying, when an image representing an object is provided as an input image, an image including the object from an image database through retrieval of local descriptors, the image recognition method comprising the steps of:
    extracting a plurality of local descriptors indicative of local features of the input image;
    limiting local descriptors obtained from images in the image database down to target local descriptors to be retrieved from each of the plurality of local descriptors in the input image;
    retrieving from the target local descriptors such local descriptors, each of the retrieved local descriptors being similar to each of the local descriptors in the input image so as to specify the retrieved local descriptors as neighbor local descriptors respectively corresponding to the plurality of local descriptors in the input image; and
    identifying at least one image to be a recognition result (recognition-result-image), from among images which include the specified neighbor local descriptors, through a statistical process, wherein:
    the limiting step limits the number of the target local descriptors to the number such that the recognition-result-image is identifiable; and
    each of the steps is executed by computer.

2. The image recognition method according to claim 1, wherein:
    the limiting step is capable of varying a degree of limit of the target local descriptors in accordance with the input image such that the recognition-result-image is identifiable.

3. The image recognition method according to claim 2, wherein:
    when the recognition-result-image is not identifiable, the limiting step lowers the degree of limit of the target local descriptors, and determines new target local descriptors by excluding the target local descriptors which were previously used; and
    the determined target local descriptors undergo the retrieving step and the identifying step.

4. The image recognition method according to claim 3, wherein:
    when the recognition-result-image is not identifiable even after the limiting step, the retrieving step, and the identifying step are repeated while the degree of limit of the target local descriptors is gradually lowered, the input image is to be rejected.

5. The image recognition method according to claim 1, wherein:
    the image database has included therein a hash table which is obtained by classifying the local descriptors with use of index values thereof calculated through a predetermined procedure, the local descriptors being extracted from the images in the image database;
    the limiting step calculates, through the predetermined procedure, index values from each of the plurality of local descriptors in the input image, while taking variation in features into account (calculating stage); refers to bins of the hash table by using each calculated index values; and regards such local descriptors that are classified in the bins as the target local descriptors;
    the identifying step performs a statistical process for voting for the images which include the neighbor local descriptors specified by the retrieving step; and
    the hash table is prepared such that, when the number of the local descriptors classified in the same bin of the hash table exceeds a threshold, the local descriptors in the bin are excluded from the target local descriptors.

6. The image recognition method according to claim 5, wherein:
    each local descriptor is represented as a vector;
    the calculating stage is performed in such a manner that a discrete value is obtained by discretion of one of the vector elements of each local descriptor, the discrete value being expanded to such neighbors that cover an error range; and
    the error range is determined in accordance with the variation of the features.

7. The image recognition method according to claim 5, wherein:
    the retrieving step performs calculation of a distance between each of the plurality of local descriptors in the input image and the local descriptors in the bins which are referred to with use of index values calculated from each of the plurality of local descriptors in the input image; and specifies at least one of the local descriptors that are within a predetermined distance, or the local descriptor in the shortest distance.

8. The image recognition method according to claim 5, wherein:
the retrieving step regards any of such local descriptors in the hash table as the neighbor local descriptors that are in the bins referred to with use of index values calculated from each of the plurality of local descriptors in the input image.

9. The image recognition method according to claim 1, wherein:
a pattern of the object included in one image in the image database is viewed from an angle different from a pattern of the object in the input image.

10. The image recognition method according to claim 1, wherein:
a pattern of the object included in one image in the image database partially corresponds to a pattern of the object in the input image.

11. An image recognition device for identifying, when an image representing an object is provided as an input image, an image including the object from an image database through retrieval of local descriptors, the image recognition device comprising:
a feature extraction section which extracts a plurality of local descriptors indicative of local features of the input image;
a limiting section which limits local descriptors obtained from images in the image database down to target local descriptors to be retrieved from each of the plurality of local descriptors in the input image;
a retrieving section which retrieves such local descriptors from the target local descriptors that are similar to each of the local descriptors in the input image so as to specify the retrieved local descriptors as neighbor local descriptors respectively corresponding to the plurality of local descriptors in the input image; and
an identifying section which identifies at least one image to be a recognition result (recognition-result-image), from among images which include the specified neighbor local descriptors, through a statistical process, wherein the limiting section limits the number of the target local descriptors to the number such that the recognition-result-image is identifiable.

12. The image recognition device according to claim 11, wherein the limiting section is capable of varying a degree of limit of the target local descriptors in accordance with the input image so that the recognition-result-image is identifiable.

13. The image recognition device according to claim 12, wherein:
when the recognition-result-image is not identifiable, the limiting section lowers the degree of limit of the target local descriptors, and determines new target local descriptors by excluding the target local descriptors which were previously used;
the retrieving section specifies neighbor local descriptors from among the determined target local descriptors; and
the identifying section further identifies the recognition-result-image in accordance with the specified neighbor local descriptors.

14. A non-transitory computer readable storage medium with an image recognition program stored thereon, wherein the program instructs a computer to perform, when an image representing an object is provided as an input image, a function of identifying an image including the object from an image database through retrieval of local descriptors, the program ensuring the computer functioning as:
a feature extraction section which extracts a plurality of local descriptors indicative of local features of the input image;
a limiting section which limits local descriptors obtained from images in the image database down to target local descriptors to be retrieved from each of the plurality of local descriptors in the input image;
a retrieving section which retrieves such local descriptors from the target local descriptors that are similar to each of the local descriptors in the input image so as to specify the retrieved local descriptors as neighbor local descriptors respectively corresponding to the plurality of local descriptors in the input image; and
an identifying section which identifies at least one image to be a recognition result (recognition-result-image), from among images which include the specified neighbor local descriptors through a statistical process, wherein the limiting section limits the number of the target local descriptors to the number such that the recognition-result-image is identifiable.

* * * * *